(12) United States Patent
Hayashi et al.

(10) Patent No.: US 7,524,068 B2
(45) Date of Patent: Apr. 28, 2009

(54) PROJECTION OPTICAL SYSTEM

(75) Inventors: Kohtaro Hayashi, Toyonaka (JP); Masayuki Imaoka, Izumiotsu (JP); Yuichi Atarashi, Hachioji (JP); Hiroshi Kibayashi, Niiza (JP)

(73) Assignee: Konica Minolta Opto, Inc., Tokyo (JP)

( * ) Notice: Subject to any disclaimer, the term of this patent is extended or adjusted under 35 U.S.C. 154(b) by 489 days.

(21) Appl. No.: 11/414,777

(22) Filed: Apr. 28, 2006

(65) Prior Publication Data

US 2006/0244930 A1 Nov. 2, 2006

(30) Foreign Application Priority Data

Apr. 28, 2005 (JP) ............... 2005-130772

(51) Int. Cl.
*G03B 21/00* (2006.01)
*G03B 21/28* (2006.01)

(52) U.S. Cl. ............... 353/51; 353/46; 353/99
(58) Field of Classification Search ............ 353/46, 353/47, 50, 51, 99, 122; 345/596, 598, 696, 345/698; 382/268

See application file for complete search history.

(56) References Cited

U.S. PATENT DOCUMENTS

| 5,237,399 | A | 8/1993 | Inada et al. ............... 358/60 |
| 6,243,055 | B1 * | 6/2001 | Fergason ............... 345/32 |
| 6,407,726 | B1 * | 6/2002 | Endo et al. ............... 345/87 |
| 6,648,476 | B2 | 11/2003 | Watanabe et al. ............... 353/97 |
| 7,052,142 | B2 * | 5/2006 | Gupta ............... 353/46 |
| 7,113,231 | B2 * | 9/2006 | Conner et al. ............... 349/5 |
| 7,411,737 | B2 * | 8/2008 | Imaoka et al. ............... 359/649 |
| 2006/0114430 | A1 * | 6/2006 | Masubuchi et al. ............... 353/99 |

FOREIGN PATENT DOCUMENTS

| JP | 4-319937 A | 11/1992 |
| JP | 7-49477 A | 2/1995 |
| JP | 2004-295042 A | 10/2004 |

* cited by examiner

*Primary Examiner*—William C Dowling
*Assistant Examiner*—Ryan Howard
(74) *Attorney, Agent, or Firm*—Sidley Austin LLP

(57) ABSTRACT

A projection optical system that performs enlargement projection of an image on a display device surface formed of a plurality of pixels onto a screen surface, in which pixel shift by less than a pixel pitch is performed on the screen surface in a vertical direction, a horizontal direction, an oblique direction, or a vertical and horizontal directions, and in which conditional formulae (1) and (2) below are fulfilled over the entire image range: (1)|ΔRG|≦0.5 d and (2)|ΔBG|≦0.5 d, where d represents the amount of pixel shift (>0), ΔRG represents lateral chromatic aberration in the direction of pixel shift of colored light R having a wavelength of 640 nm with respect to colored light G having a wavelength of 546 nm, and ΔBG represents lateral chromatic aberration in the direction of pixel shift of colored light B having a wavelength of 450 nm with respect to the colored light G having a wavelength of 546 nm.

27 Claims, 10 Drawing Sheets

ANGLE OF ROTATION 0°
APERTURE 1.00

ANGLE OF ROTATION 20°
APERTURE 0.529

ANGLE OF ROTATION 5°
APERTURE 0.947

ANGLE OF ROTATION 25°
APERTURE 0.360

ANGLE OF ROTATION 10°
APERTURE 0.845

ANGLE OF ROTATION 30°
APERTURE 0.226

ANGLE OF ROTATION 15°
APERTURE 0.704

ANGLE OF ROTATION 32.5°
APERTURE 0.173

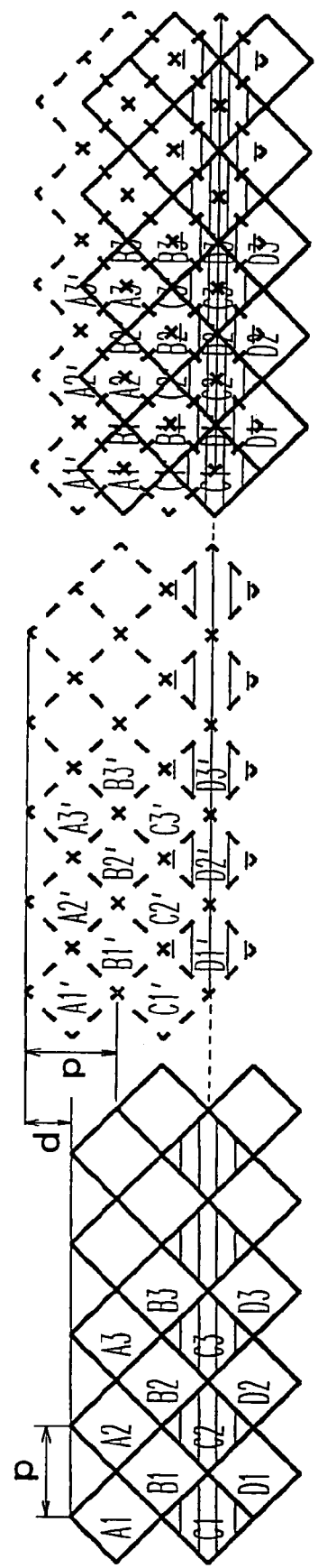

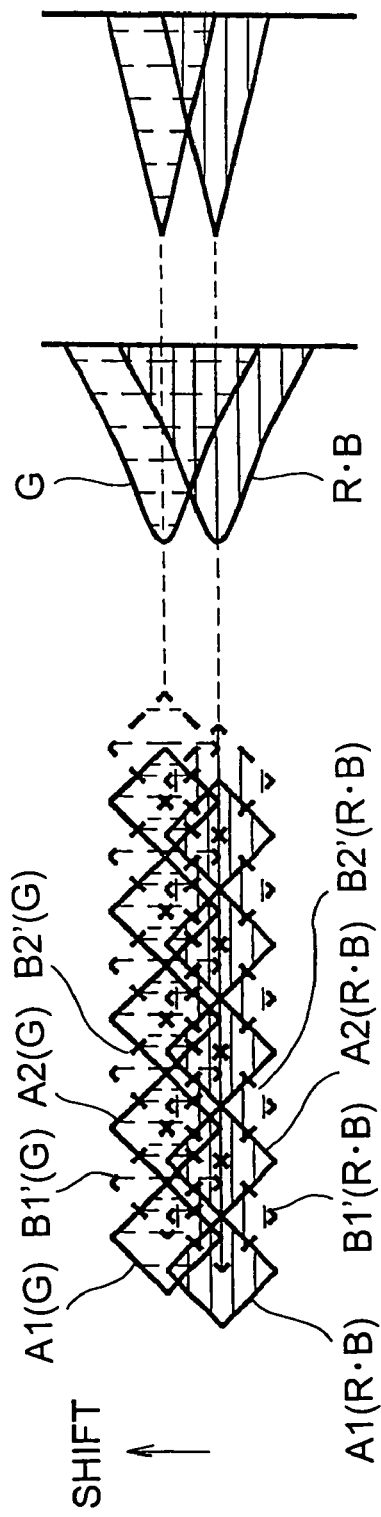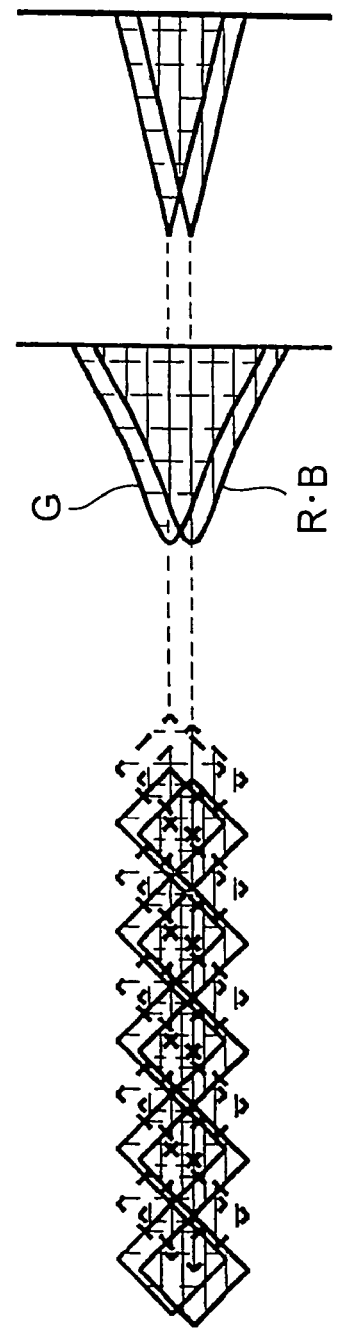

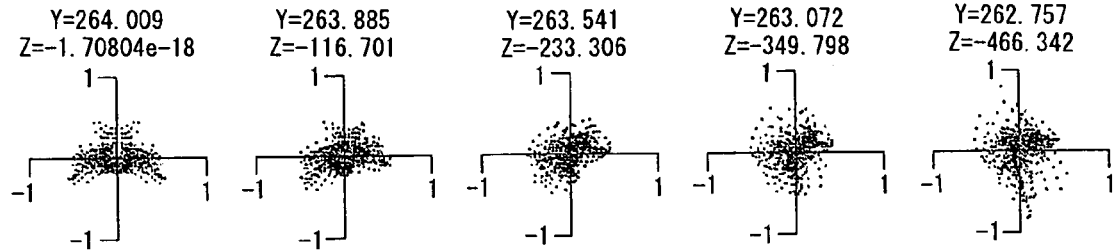
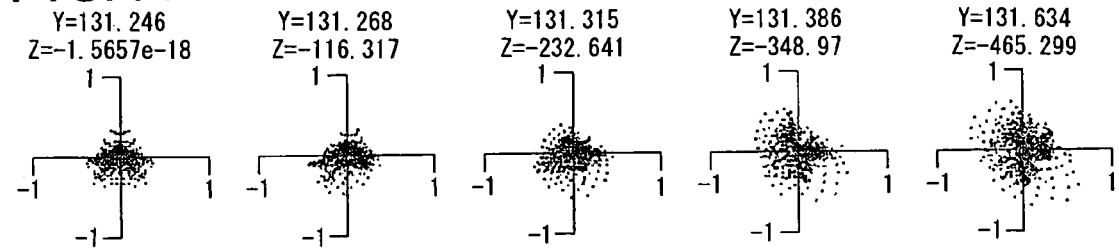
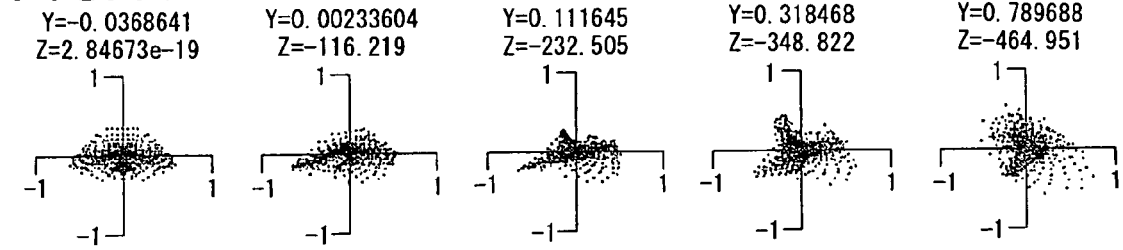
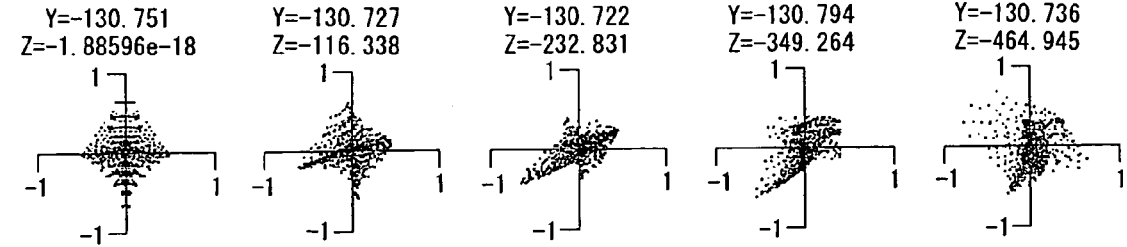
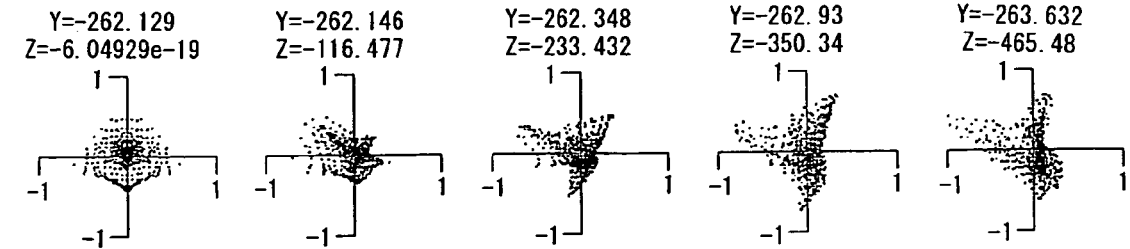

this application is based on Japanese Patent Application No. 2005-130772 filed on Apr. 28, 2005, the contents of which are hereby incorporated by reference.

PROJECTION OPTICAL SYSTEM

This application is based on Japanese Patent Application No. 2005-130772 filed on Apr. 28, 2005, the contents of which are hereby incorporated by reference.

BACKGROUND OF THE INVENTION

1. Field of the Invention

The present invention relates to a projection optical system, and more specifically to an image projection apparatus having, for example, a digital micromirror device or a LCD (liquid crystal display), as a display device and to a projection optical system that is mounted in the image projection apparatus and that perform enlargement projection of an image formed on the surface of the display device onto the screen surface.

2. Description of Related Arts

As an image display for use in digital satellite broadcasts at home and a home theater, low-cost and high-performance image projection apparatuses (that is, projectors) having a digital micromirror device or an LCD as a display device have been becoming increasingly widespread in recent years. Thus, there has been a great demand for a slim rear projector that does not occupy too much space even in a small room, which requires a wider-angle projection optical system. Moreover, the volume of information displayed has been considerably larger than before, and the display device has been provided with an increasingly higher resolution than before accordingly, thus leading to a demand for smooth, clear, and high-quality images.

To achieve a low-cost rear projector with a high resolution, so-called pixel shift has been conventionally practiced by which an image projected on the screen surface is shifted periodically by a small degree (for example, one half of a pixel) so as to increase the apparent number of pixels. The practice of pixel shift causes pixels to be superimposed on one another due to after-image, which makes the contour of the pixels projected on the screen surface less outstanding, thereby permitting display of a smooth image. Moreover, due to its ability to increase the volume of information displayed on the screen surface without changing the number of pixels of the display device, the pixel shift is very effective in achieving a higher-grade image through an improvement in the resolution. As a projector employing this pixel shift, Patent publications 1 and 3 propose those which achieve pixel shift by way of slightly decentering a mirror while Patent publication 2 proposes one which achieves pixel shift by way of slightly decentering a flat glass.

Patent publication 1: JP 4-319937 A
Patent publication 2: U.S. Pat. No. 5,237,399
Patent publication 3: JP 7-49477 A With the projector constructions proposed in Patent publications 1 to 3, image projection is performed with an optical power possessed by a refractive optical system. The refractive optical system typically has lateral chromatic aberration which deteriorates the sharpness level (resolution feeling) of an image. In pixel shift, when the projection optical system has a predetermined value of lateral chromatic aberration or more, for example, a white line, if displayed, is recognized as a double line. This will be described in detail.

A normal display device surface has matrix structure with a square array of square pixels whose sides are parallel to the vertical and horizontal sides of the image. For pixel shift, "oblique pixel arrangement" is more suitable. In the oblique pixel arrangement, as shown in FIG. 8A, a layout is provided such that the sides of square pixel tilts obliquely by 45 degrees with respect to the vertical and horizontal sides of the image. The length of a diagonal line of each pixel corresponds to a pixel pitch p of horizontal pixel arrays (A1, A2, A3, . . . ; B1, B2, B3, . . . ; C1, C2, C3, . . . ; D1, D2, D3, . . . ). Therefore, when pixel shift (d: amount of pixel shift) is performed vertically upward by a half pitch (=p/2) with respect to the horizontal pixel arrays, the pixel arrays before the shift (A1, A2, A3, . . . ; B1, B2, B3, . . . ; C1, C2, C3, . . . ) shown in FIG. 8A and the pixel array after the shift (B1', B2', B3', . . . ; C1', C2', C3', . . . ; D1', D2', D3', . . . ) shown in FIG. 8B are alternately located on the same straight line as shown in FIG. 8C.

Performing pixel shift by linking to switching of image display so as to display a former frame with the pixel arrays before the shift (A1, A2, A3, . . . ; B1, B2, B3, . . . ; C1, C2, C3, . . . ; D1, D2, D3, . . . ) and display a latter frame with the pixel arrays after the shift (A1', A2', A3', . . . ; B1', B2', B3', . . . ; C1', C2', C3', . . . ; D1', D2', D3', . . . ) results in doubling the amount of information due to visual superimposing of the pixels, thereby providing a high definition projected image. For example, with the pixel array C1, C2, C3, . . . of the former frame and the pixel array D1', D2', D3', . . . of the latter frame, one line of image composed of a pixel array of C1, D1', C2, D2', C3, D3', . . . can be displayed.

Even when pixel shift is performed with the oblique pixel arrangement as described above (FIGS. 8A to 8C), if the projection optical system has a refractive surface, lateral chromatic aberration occurs on the screen surface Si. FIG. 9A shows one example of display of colored light of G and (R+B) before and after the shift. In FIG. 9A, a vertical line portion is displayed in G while a horizontal line portion is displayed in R and B. The intensity distribution of G and (R+B) as shown in FIG. 9B is obtained, shift of which corresponds to lateral chromatic aberration (component in the direction of pixel shift). The intensity distribution is mountain-shaped due to the oblique pixel arrangement; as a result, a deep valley is formed between the peak of G and the peak of R and B, thus resulting in a double-line-like appearance of the projected image, which leads to deterioration in image quality (resolution feeling in particular). More favorable imaging performance (coma, spherical aberration, astigmatism and the like), other than lateral chromatic aberration, which the projection optical system possesses results in more clear display of the double line, as shown in FIG. 9C. In addition, the same problem of a double line also appears in the case of pixel arrangement with square arrays having a small aperture ratio. Even when a double line is not formed, lateral chromatic aberration damages the resolution feeling of an image, thus reducing the effect of pixel shift.

SUMMARY OF THE INVENTION

In view of such a condition, the present invention has been made, and it is an object of the invention to provide a projection optical system capable of making full use of effect of higher resolution and higher grade achieved by pixel shift.

To achieve the object described above, one aspect of the invention refers to a projection optical system that performs enlargement projection of an image on a display device surface formed of a plurality of pixels onto a screen surface, in which pixel shift by less than a pixel pitch is performed on the screen surface in a vertical direction, a horizontal direction, an oblique direction, or a vertical and horizontal directions, and in which conditional formulae (1) and (2) below are fulfilled over the entire image range: (1) $|\Delta RG| \leq 0.5\,d$ and (2) $|\Delta BG| \leq 0.5\,d$, where d represents the amount of pixel shift (>0), $\Delta RG$ represents lateral chromatic aberration in the direction of pixel shift of colored light R having a wavelength of 640 nm with respect to colored light G having a wavelength of 546 nm, and ΔBG represents lateral chromatic aberration in the direction of pixel shift of colored light B having a wavelength of 450 nm with respect to the colored light G having a wavelength of 546 nm.

Another aspect of the invention refers to an image projection apparatus including a projection optical system, a display device, and a pixel shift mechanism, in which the projection optical system performs enlargement projection of an image on a display device surface formed of a plurality of pixels onto a screen surface, wherein pixel shift by less than a pixel pitch is performed on the screen surface in a vertical direction, a horizontal direction, an oblique direction, or a vertical and horizontal directions, and in which conditional formulae (1) and (2) below are fulfilled over an entire image range: (1)|ΔRG|≦0.5 d and (2) |ΔBG|≦0.5 d where d represents an amount of pixel shift (>0), where ΔRG represents lateral chromatic aberration in the direction of pixel shift of colored light R having a wavelength of 640 nm with respect to colored light G having a wavelength of 546 nm, and ΔBG represents lateral chromatic aberration in the direction of pixel shift of colored light B having a wavelength of 450 nm with respect to the colored light G having a wavelength of 546 nm; in which the display device has oblique pixel arrangement such that the plurality of pixels on the display device surface are square pixels, each of which is arranged obliquely by 45 degrees with respect to the longer sides and shorter sides of the display device surface and forms an image based on an inputted image signal; and in which the pixel shift mechanism performs the pixel shift by linking to switching of image display by the display device.

BRIEF DESCRIPTION OF THE DRAWINGS

FIG. 8 is a schematic diagram showing pixel shift in oblique pixel arrangement;

FIG. 9 is an explanatory diagram showing a double line generated by large lateral chromatic aberration when pixel shift is performed with the oblique pixel arrangement;

FIG. 10 is an explanatory diagram showing a double line generated by small lateral chromatic aberration when pixel shift is performed with the oblique pixel arrangement; and FIG. 11 is a spot diagram on the screen surface under the condition that a mirror is not slightly decentered in the example of the projection optical system.

DETAILED DESCRIPTION OF THE PREFERRED EMBODIMENTS

Figure 1:
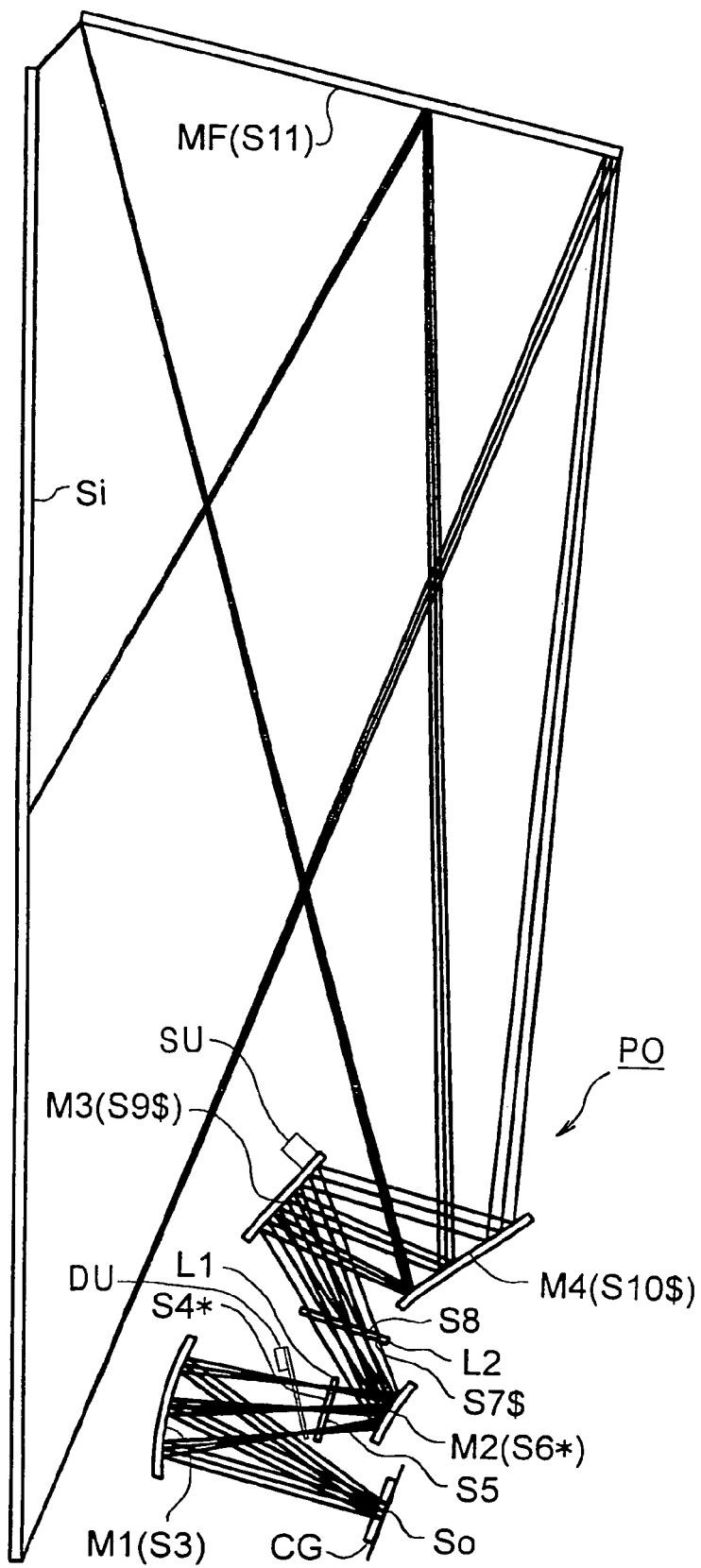
FIG. 1 is an optical path diagram showing the optical construction of a projection optical system of an embodiment (example)

Hereinafter, an embodiment of a projection optical system and an image projection apparatus according to the present invention and the like will be described, with reference to the accompanying drawings. FIG. 1 shows the optical construction (optical arrangement, projection optical path, and the like) of the projection optical system PO of the invention along the entire projection optical path from a display device surface So to a screen surface Si in optical section as viewed along the longer sides of an image on the display device surface So. That is, in the rectangular coordinate system (x, y, z) where the x-axis runs normal to the display device surface So, where the y-axis runs along the shorter sides of the image on the display device surface So, and where the z-axis runs along the longer sides of the image on the display device surface So, FIG. 1 shows the optical construction along the entire projection optical path in this embodiment as viewed on the xy-section. In FIG. 1, an optical surface marked with an asterisk "*" is a rotation-symmetric aspherical surface, and an optical surface marked with a dollar sign "$" is a rotation-asymmetric aspherical surface (so-called free curved surface).

The projection optical system PO shown in FIG. 1 is designed for use in an image projection apparatus to perform oblique enlargement projection of an image formed on the display device surface So composed of a plurality of pixels onto the screen surface Si. Accordingly, the display device surface So corresponds to the image formation surface of a display device that forms a two-dimensional image by modulating the intensity of light or otherwise, and the screen surface Si corresponds to the image projection surface thereof. Near the display device surface So, a cover glass CG of the display device is located. In this embodiment, a digital micromirror device is assumed as the display device and used as a display device DS for an image projection apparatus (FIG. 7) to be described later. It should be understood, however, that the display device to be used is not limited to a digital micromirror device, but may be any other kind of non-luminous, reflective (or transmissive) display device (for example, a liquid crystal display device) that suits this embodiment. In a case where a digital micromirror device is used as the display device, light incident thereon is reflected by individual micromirrors, each either in an ON or OFF state (for example, inclined at ±12°), so as to be is spatially modulated. As a result, only the light reflected by the micromirrors in the ON state enters the projection optical system PO so as to be projected onto the screen surface Si. Instead of the display device described above, a self-luminous display device may be used. When a self-luminous display device is used as a picture display device, there is no need to provide a light source and the like for illumination, and therefore it is possible to make the optical construction more lightweight and compact.

It should be understood that the optical construction of this embodiment does not necessarily have to be designed exactly as shown in FIG. 1, but may be inverted upside down. That is, designing any of the constructions shown in FIG. 1 upside down to suit the actual apparatus arrangement, optical system arrangement, and the like causes no problem whatsoever. Moreover, in this embodiment, an image is projected onto the screen surface Si by bending the optical path with a flat mirror MF on the ceiling. However, the bending of the optical path on a flat reflective surface is not limited to such a pattern; therefore, this can be achieved by applying, for example, a pattern that bends the optical path in an anteroposterior direction, a pattern that bends the optical path in the horizontal direction, and the like.

The projection optical system PO is optically so constructed as to perform enlargement projection obliquely from the display device surface So on the reduction side onto the screen surface Si on the enlargement side and thus be suitable for use in a rear-projection-type image projection apparatus (rear projector). However, this projection optical system PO may also be used, as an oblique projection optical system that performs reduced projection obliquely from the screen surface Si to the display device surface So, for an image reading apparatus. In that case, the display device surface So corresponds to the photoreceptive surface of a photoreceptive device (for example, a CCD (charge-coupled device)) for image reading, and the screen surface Si corresponds to the surface of an image (for example, a document) to be read. The reflective surface that light passes immediately before reaching the screen surface Si on the enlargement side is a flat reflective surface. The flat mirror MF on which this reflective surface is formed may be removed and a screen may be placed at the resulting new position of the screen surface Si (that is, the mirror image position of the screen surface Si with respect to the flat reflective surface). This makes the projection optical system usable in a front-projection-type image projection apparatus (front projector), which can also be used as a reduction optical system in such an embodiment.

In the projection optical system PO, both a reflective optical element and a transmissive optical element are used. Used as a reflective optical element are a curved mirror having a curved reflective surface and a flat mirror having a flat reflective surface. A reflective optical element used is not limited to a mirror, but may be, for example, a kind of prism having a curved or flat reflective surface. Moreover, one or more reflective optical elements each having a plurality of reflective surfaces may be used, and an optical element having a reflective surface, refractive surface, or diffractive surface, or a combination thereof may be used. Used as a transmissive optical element is a refractive lens having a curved refractive surface. A transmissive optical element used is not limited to a refractive lens that deflects the light incident thereon by refraction (that is, one that deflects light at the interface between two media having different refractive indices), but may be a diffractive lens that deflects the light incident thereon by diffraction, a refractive/diffractive hybrid lens that deflects the light incident thereon by the combined effect of diffraction and refraction, a gradient-index lens that deflects the light incident thereon through varying refractive indices distributed within a medium, or the like.

The optical construction of the projection optical system PO will be described in more detail below. As shown in FIG. 1, arranged in order along the projection optical path from the display device surface So to the screen surface Si are: the cover glass CG; a first curved mirror M1 having a curved reflective surface S3 formed with a spherical surface; a substantially non-power refractive lens L1 whose reduction side surface S4 is formed with a rotation-symmetric aspherical surface and whose enlargement side surface S5 is formed with a flat surface; a second curved mirror M2 having a curved reflective surface S6 formed with a rotation-symmetric aspherical surface; a substantially non-power refractive lens L2 whose reduction side surface S7 is formed with a rotation-asymmetric free curved surface and whose enlargement side surface S8 is formed with a flat surface; a third curved mirror M3 having a curved reflective surface S9 formed with a rotation-asymmetric free curved surface; a fourth curved mirror M4 having a curved reflective surface S10 formed with a rotation-asymmetric free curved surface; and the flat mirror MF having a flat reflective surface S11 for bending an optical path.

The practice of pixel shift described above causes pixels to be superimposed on one another due to after-image, which makes the contour of the pixels projected on the screen surface less outstanding, thereby permitting display of a smooth image. Moreover, due to its ability to increase the volume of information displayed on the screen surface without changing the number of pixels of the display device, the pixel shift is very effective in achieving a higher-grade image through an improvement in the resolution (that is, an increase in the apparent number of pixels). More specifically, the pixels projected on the screen are periodically slightly decentered so that the amount of this shift becomes less than the pixel pitch (for example, one half of a pixel). This period may be any period that permits after-image to occur, for example, 1/30 second or 1/60 second which is a typical frame rate of a moving image. The trajectory of the pixel on the screen may be what is formed by linear reciprocal motion, circle, rectangle, or the like. On the display device, an image corresponding to the position of pixel shift is formed, which is projected onto the screen by the projection optical system. This permits achieving an improvement in the resolution. To perform such pixel shift, adding to the projection optical system an optical component having no optical power for image projection causes an increase in the number of components, an increase in the back focus, and the like, which leads to upsizing of the entire apparatus and a cost increase. Moreover, the configuration such that a refractive surface is decentered suffers from occurrence of chromatic aberration and the like. Thus, this embodiment adopts configuration with which pixel shift is performed by slightly decentering the third curved mirror M3 with a pixel shift mechanism SU (FIG. 1).

Figure 2:
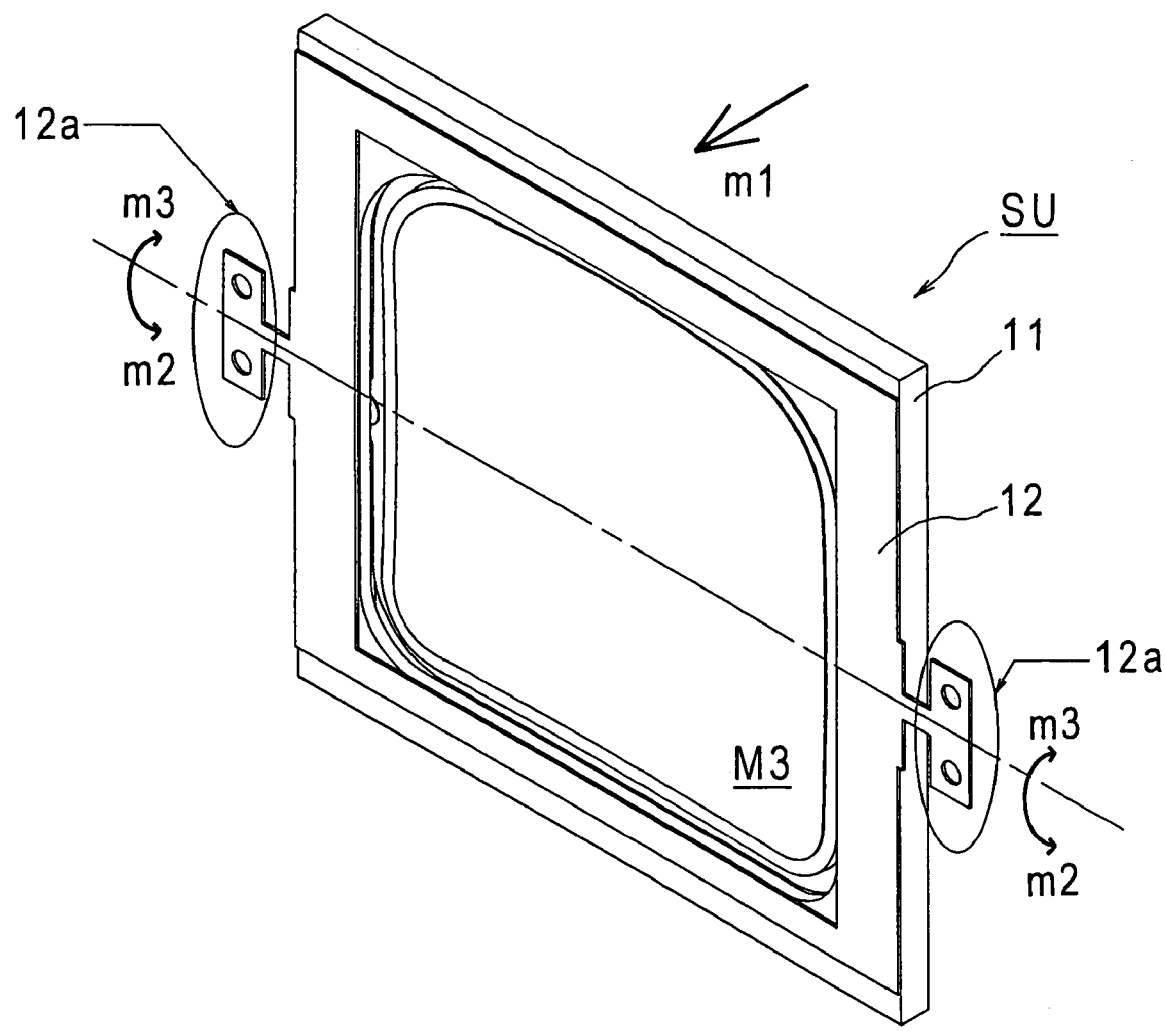
FIG. 2 is a perspective view partially showing the exterior of a pixel shift mechanism.
Figure 3:
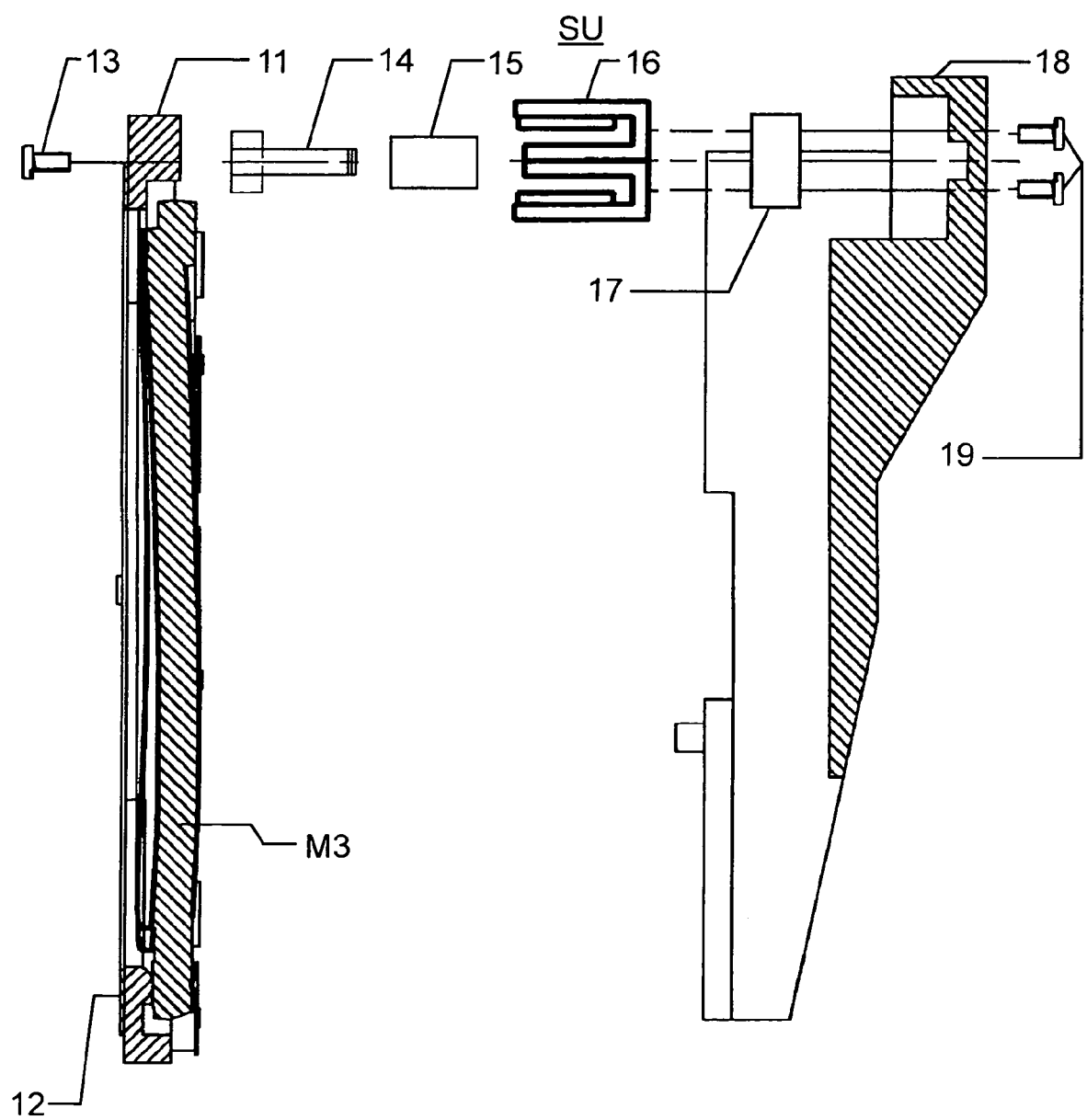
FIG. 3 is a sectional view showing the assembly structure of the pixel shift mechanism.

FIG. 2 partially shows the exterior of the pixel shift mechanism SU, and FIG. 3 shows the assembly structure of the pixel shift mechanism SU. The third curved mirror M3 is held by a mirror holder 11, to which a thin metal plate 12 is fixed. The metal plate 12 has on both sides thereof hinge parts 12a (FIG. 2), which fixes the metal plate 12 to an assembly holder 18 (FIG. 3) with screws (not shown). As shown in FIG. 3, to the mirror holder 11 is fixed, with a screw 13, a coil holder 14, to which a coil 15 is fitted. On the other hand, to the assembly holder 18, a magnet unit 16 is fixed with screws 19.

The coil holder 14, the coil 15, and the magnet unit 16 compose an actuator for driving the third curved mirror M3. Flow of current into the coil 15 generates an electromagnetic power between the coil 15 and the magnet unit 16, and a drive force thereof presses the top of the mirror holder 11 in the direction of an arrow m1 (FIG. 2). Since the metal plate 12 fixed the mirror holder 11 is fixed at the hinge parts 12a on the both sides thereof to the assembly holder 18 (FIG. 3), the hinge parts 12a have hinges thereof twisted in the direction of an arrow m2 (FIG. 2), whereby the third curved mirror M3 tilts together with the mirror holder 11. Stopping the flow of current into the coil 15 generates a force of restoring the twist of the hinge part 12a in the direction of an arrow m3 (FIG. 2) whereby the original state is restored. Vibrating the third curved mirror M3 by repeating this operation permits pixel shift to be performed by slight decentering of the third curved mirror M3. The position of the third curved mirror M3 is detected by a sensor (not shown) composed of a hall element. This sensor is fixed to the top portion of the mirror holder 11 and detects, as a magnetic change, a relative movement (that is, a change in the relative position) of a sensor magnet 17 fixed to the assembly holder 18. Based on the detection results, the position of the third curved mirror M3 can be identified.

As shown in FIG. 1, between the first curved mirror M1 and the refractive lens L1, a variable aperture mechanism DU is arranged. This variable aperture mechanism DU dynamically changes the amount of projected light at high speeds in accordance with the brightness of an image displayed on the display device surface So (for example, high speed that makes identification by the human impossible). The variable aperture mechanism DU (for example, for each frame) operates at height speed, and changes the brightness and darkness of a projected image by opening and closing the aperture based on image-brightness-related information an image signal possesses, thus resulting in an improvement in apparent contrast of a projected image.

Figure 4:
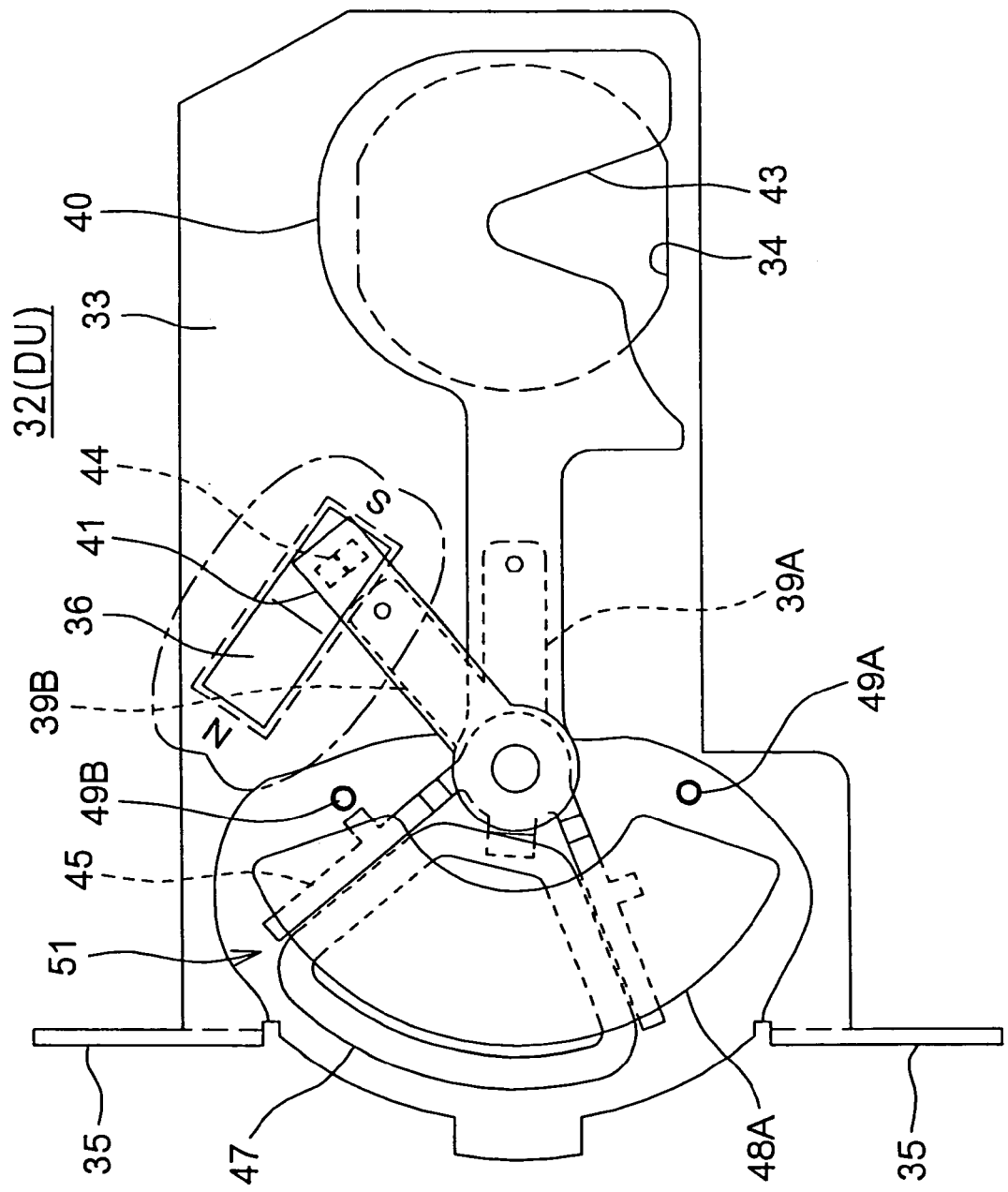
FIG. 4 is a plan view of an aperture unit into which a variable aperture mechanism is integrated.
Figure 5:
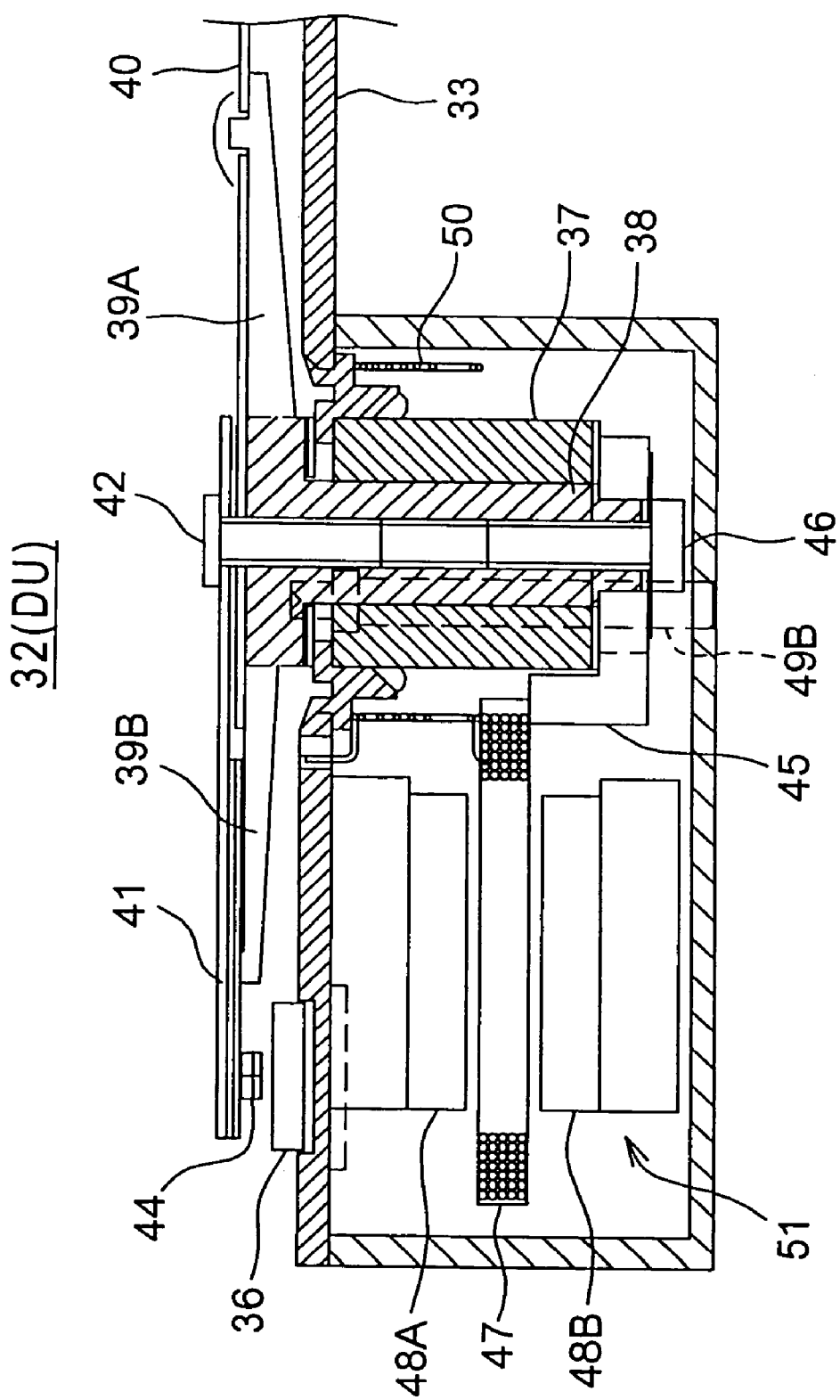
FIG. 5 is a partially enlarged sectional view of the aperture unit into which the variable aperture mechanism is integrated.
Figure 6A:
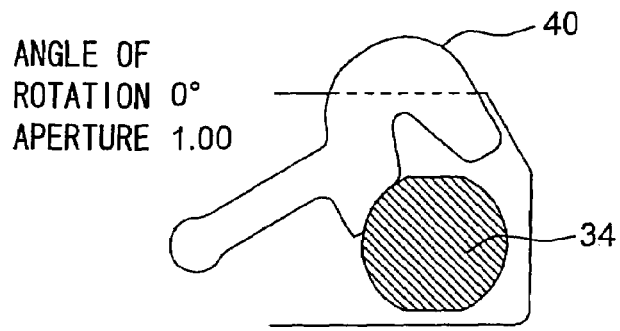
FIG. 6 is a schematic diagram showing the relationship between the angle of rotation and the aperture rate of a light shielding plate in the variable aperture mechanism.
Figure 6E:
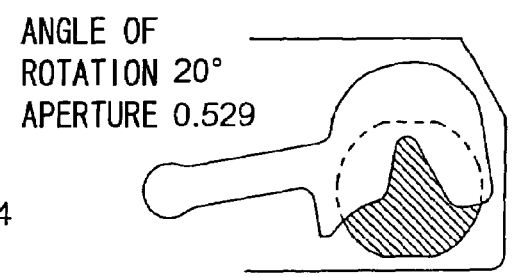
Figure 6B:
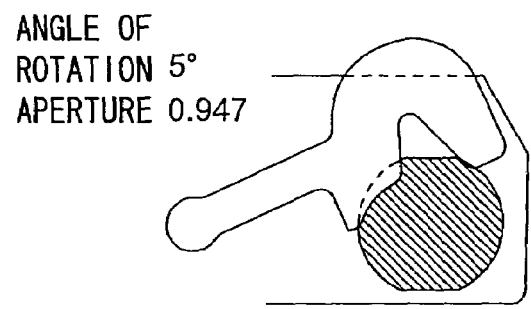
Figure 6F:
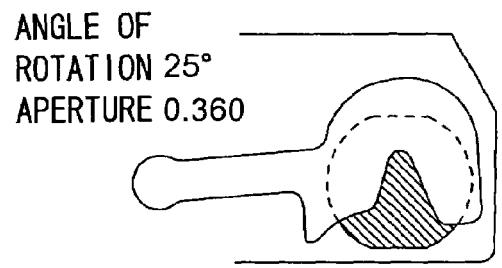
Figure 6C:
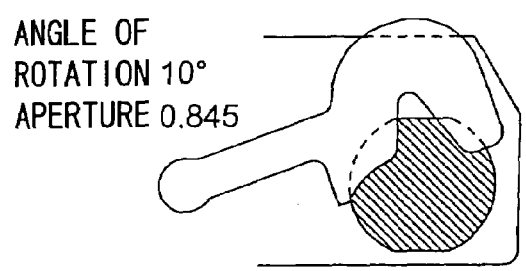
Figure 6G:
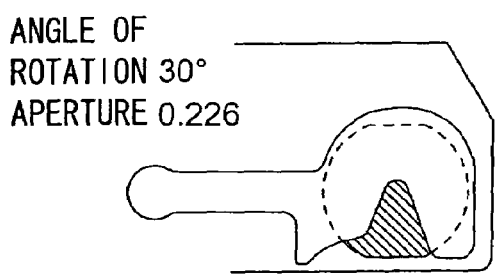
Figure 6D:
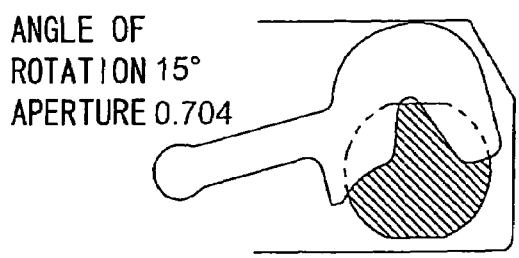
Figure 6H:
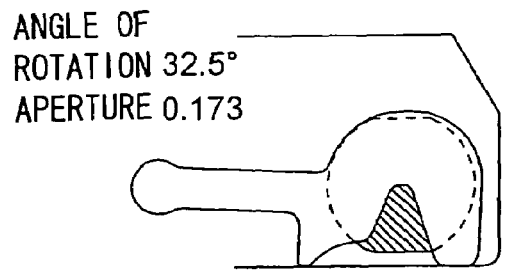

FIGS. 4 and 5 show an aperture unit 32 incorporated in the variable aperture mechanism DU. The aperture unit 32 has a base 33 formed of a rectangular metallic (SUS) plate having a fixed aperture hole 34 formed at one end side thereof and two fitting seats 35 extending at the other end side thereof. At a substantially central portion of the base 33, a magnet 36 is fitted. To the base 33, a bearing 37 (FIG. 5) is fixed into which a rotary shaft 38 is inserted. At one end of the rotary shaft 38, two arms 39A and 39B are so provided as to extend in parallel to the base 33. Of these two arms, a light shielding plate 40 of metal (aluminum) is placed at the arm 39A while a sensor support plate 41 is placed to the other arm 39B. The light shielding plate 40 and the sensor support plate 41 are fixed to the rotary shaft 38 with a screw 42. The leading end of the light shielding plate 40 extends to a fixed aperture hole 34 of the base 33, with a notch 43 (FIG. 4) formed in a V-shape in a portion thereof opposing the fixed aperture hole 34.

To the leading end of the sensor support plate 41, a hall element 44 is so fitted as to oppose the magnet 36 of the base 33. The movement of the hall element 44 caused by turning the light shielding plate 40 causes the hall element 44 to output a voltage in accordance with magnetic flux density of the magnet 36 at the position to which the hall element has moved. Since the magnet 36 is oriented parallel to the turning surface of the light shielding plate 40 (that is, the moving direction of the hall element 44), the voltage outputted by the hall element 44 changes linearly with respect to a change in the position of the hall element 44 (that is, the angle of rotation by the light shielding plate 40). Previously storing a table indicating the relationship between the voltage outputted by the hall element 44 and the position of the hall element 44 (that is, the angle of rotation of the light shielding plate 40) permits recognizing the position of the hall element 44 (that is, the angle of rotation of the light shielding plate 40) based on the voltage outputted by the hall element 44.

To the other end of the rotary shaft 38 (FIG. 5), a coil support frame 45 is installed which is V-shaped and is fixed with a screw 46. At the coil support frame 45, a coil 47 wound in a fan-like form is supported by bonding. To the base 33, a pair of magnets 48A and 48B is so fitted as to sandwich the coil 47. In addition, to the base 33, stoppers 49A and 49B are fitted which abut the coil support frame 45 to thereby regulate the turning range of the light shielding plate 40. Around the bearing 37, a torsion spring 50 (FIG. 5) is fitted whose one end engages with the base 33 and whose the other end engages with the coil support frame 45. This torsion spring 50 biases the rotary shaft 38 in a direction in which the light shielding plate 40 completely escapes from the fixed aperture hole 34 to become fully open. The coil support frame 45, the coil 47, and a pair of magnets 48A and 48B described above compose an actuator 51 that drives the light shielding plate 40.

The turning range of the light shielding plate 40 (that is, angle of rotation) is 32.5 degrees, and the amount of projected light changes in accordance with the amount in which the light shielding plate 40 rotates to thereby enter the beam of light. FIGS. 6A to 6H show the relationship between the angle of rotation of the light shielding plate 40 and the aperture rate in the variable aperture mechanism DU. As shown in FIGS. 6A to 6H, the turning of the light shielding plate 40 from 0 degree to 32.5 degrees shields light at the fixed aperture hole 34. At this point, the ratio of the area of the aperture excluding the portion where the light is shielded by the light shielding plate 40 with respect to the area of the fixed aperture hole 34 (that is, the aperture rate) changes almost linearly from 1 to 0.173.

The light shielding plate 40 of the variable aperture mechanism DU is arranged near the fixed aperture hole 34 plus at the screen surface Si (FIG. 1) side of the fixed aperture hole 34. This permits preventing the possible movement of the light shielding plate 40 from being affected by heat generation of the light shielding plate 40 caused by heat received from beam of light at the light source side of the fixed aperture hole 34. This prevention is further effective since the light shielding plate 40 tilts with respect to the display device surface So. In addition, a path of projected light between the first curved mirror M1 and the second curved mirror M2 corresponds to a portion where a beam of light exiting from the display device surface So is first reflected and travels; therefore, the diameter of the beam of light is relatively small and thus a large space is provided around the beam of light. The variable aperture mechanism DU is installed at an appropriate position utilizing this large space. Therefore, it is preferable that an aperture be configured to vary between the first and second curved mirrors M1 and M2.

The actuator 51 of the aperture unit 32 is arranged in a space between a beam of light traveling from the first curved mirror M1 to the second curved mirror M2 and a beam of light traveling from the second curved mirror M2 to the third curved mirror M3, as shown in FIG. 1. On the other hand, the position where the light shielding plate 40 of the aperture unit 32 inserted in the path of projected light is retracted is arranged in a space at the side of the projected light path surface. A beam of light which exits from the display device surface So, is reflected on the first curved mirror M1, and travels toward the second curved mirror M2 and a beam of light which is reflected on the second curved mirror M2 and travels toward the third curved mirror M3 have still a small diameter; therefore, the space between the beams of light and the space at the side of the optical path surface formed by the optical path thereof are also large. Positions where the actuator 51 and the light shielding plate 40 of the variable aperture mechanism DU are retracted are located at respective appropriate positions by utilizing this large space while avoiding interference with the optical path.

In this embodiment, the variable aperture and the fixed aperture are provided in one aperture unit 32, but may be provided separately from each other. In that case, arranging the fixed aperture at the pupil position can minimize shift in matching of the pupil position. Arranging the light shielding plate at a position out of the pupil position where the fixed aperture is located can provide the variable aperture at a position such as the pupil position which is less restricted, thereby permitting a compact configuration of the image projection apparatus.

Figure 7:
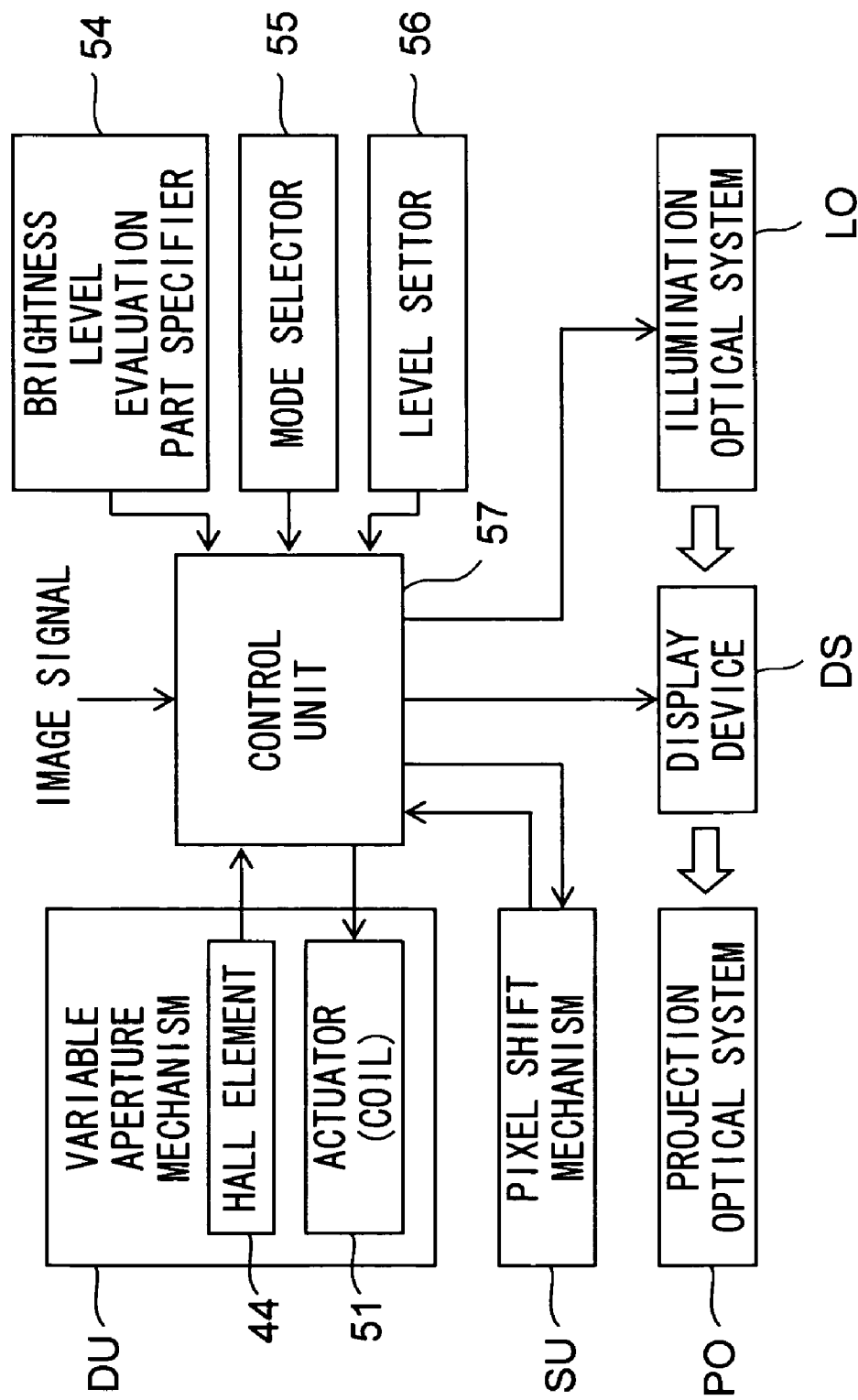
FIG. 7 is a block diagram showing the overall configuration of the image projection apparatus of the embodiment.

FIG. 7 is a block diagram showing the overall configuration of the image projection apparatus. This image projection apparatus includes: a display device (for example, digital micromirror device) DS, an illumination optical system LO, a projection optical system PO, the pixel shift mechanism SU, the variable aperture mechanism DU, a brightness level evaluation part specifier 54, a mode selector 55, a level setter 56, a control unit 57, and the like. As described above, the pixel shift mechanism SU and the variable aperture mechanism DU are loaded by being combined with the projection optical system PO (FIG. 1) to additionally provide the image projection apparatus with a pixel shift function and a high-speed variable aperture function. Note that, in FIG. 7, thin arrows denote the flow of a signal while thick arrows denote the flow of light.

The brightness level evaluation part specifier 54 outputs an evaluation part signal specified by the user (for example, a signal indicating whether evaluation of the brightness level of an image signal is focused on the center of the image or the average of the entire image is obtained, or the like). The mode selector 55 outputs a mode signal of a picture scene (for example, a picture scene at a movie mode, a sport mode, or the like) selected by the user. The level setter 56 outputs a level signal of variable aperture effect set by the user (for example, three levels of the variable aperture effect, namely, strong, intermediate, and weak levels). The control unit 57 drives the illumination optical system LO and the pixel shift mechanism SU, and also controls the display device DS based on image signals of video, television, and the like. For example, in controlling driving of the pixel shift mechanism SU (FIGS. 2 and 3), a signal from a sensor (not shown) composed of a hall element (that is, a position detection signal of the third curved mirror M3) is transmitted to the control unit 57, so that, based on this signal, the control unit 57 controls a current to flow through the coil 15 (FIG. 3) so as to drive the third curved mirror M3. In addition, the control unit 57 drives the actuator 51 of the variable aperture mechanism DU based on various signals (for example, an image signal, a mode signal from the mode selector 55, a level signal from the level setter 56, the position detection signal of the light shielding plate 40 from the hall element 44).

Next, operation performed by the image projection apparatus shown in FIG. 7 will be described, focusing on in particular the operation of the variable aperture mechanism DU by the control unit 57. First, in accordance with an evaluation part specified by the brightness level evaluation part specifier 54, an image signal of a given frame is evaluated for its brightness level distribution, and a gain value and an aperture value suitable for the mode and level set are determined through calculation. The actuator 51 is driven to rotate the light shielding plate 40 at an angle corresponding to the aperture value described above. The drive force of the actuator 51 is provided by an electromagnetic power generated by flow of a current to the coil 47. For drive control, the rotation speed can be varied by changing the duty ratio with a rectangular signal with a fixed voltage, and can be reversed by reversing + and −.

As a result of the drive control of the actuator 51 described above, the effective diameter of a beam of light of the projection optical system PO is adjusted whereby the amount of light is increased or decreased. For a picture scene with a high brightness level, the amount of light is increased by increasing the effective beam of light to thereby stress a bright portion. For a picture scene with a low brightness level, the amount of light is decreased by decreasing the effective beam of light to thereby stress a dark portion. In particular, the smaller the effective beam of light is, the more the peripheral edge part of the effective beam of light is shielded, whereby scattering of light decreases, thus permitting an improvement in the contrast on the image. Viewing the displayed image, the user can set a preferred image by changing the evaluation part by the brightness level evaluation part specifier 54 or changing the level of the variable aperture effect by the level setter 56.

In a multimirror projection optical system, like the projection optical system PO (FIG. 1) described above, in which most of optical power is covered by a reflection system, a curved mirror is typically used which has a reflective surface whose shape is aspherical or freely curved. The curved mirror is usually mass produced by using, for its formation, a mold fabricated by cutting processing and then transferring the shape of its surface. When the cutting processing is performed, even if a smaller processing pitch is used or polishing processing or the like is performed to such a degree that maintain a satisfactory accuracy after the cutting processing, a trace of cutting of approximately 5 nm to 20 nm remains on the mirror surface. Needless to say, a trace of processing in grinding or the like instead of cutting processing also remains which is similar to the trace of cutting processing. Thus, displaying a uniform image (displaying an image of a single color) brings about a problem that a stripe pattern is thinly formed on the projected screen due to a trace of cutting. Especially in a case where the variable aperture mechanism DU is used, the strike pattern becomes remarkably outstanding with small aperture, so that a mirror located farther from the aperture is more influenced by the trace of cutting. In this embodiment, an image is always slightly moved by the pixel shift mechanism SU, thereby providing effect that a stripe pattern formed as a result of a trace of cutting becomes less visible. That is, outstanding deterioration in the image quality when the aperture is varied with a multimirror projection optical system at high speed can be resolved by effect of the pixel shift.

In FIGS. 9A to 9C described above, reducing the lateral chromatic aberration occurring in the projection optical system results in display of the colored light G and (R+B) before and after the shift as shown in FIG. 10A, the intensity distribution of G and (R+B) results as shown in FIG. 10B, and the variable aperture effect for the double line results as shown in FIG. 10C. More specifically, controlling the amount d of pixel shift for lateral chromatic aberration at 0.5 d or below makes double line less outstanding, thus permitting providing a sharp line image. This effect is further enhanced by controlling the lateral chromatic aberration at 0.3 d or below.

The wavelength defining the lateral chromatic aberration that can be identified by the mage projection apparatus can be assumed as 640 nm for red colored light R, as 546 nm for green colored light G, and as 450 nm for blue colored light B. Therefore, from the viewpoints described above, it is preferable that the projection optical system perform pixel shift on the screen surface by less than the pixel pitch in the vertical direction, the horizontal direction, an oblique direction, or the vertical and horizontal directions and also fulfill formulae (1) and (2) below over the entire image range (as a result, maximum image height position):

$$|\Delta RG| \leq 0.5\, d \tag{1}$$

$$|\Delta BG| \leq 0.5\, d \tag{2}$$

where d represents the amount of pixel shift (>0),

ΔRG represents lateral chromatic aberration in the direction of pixel shift of the colored light R having a wavelength of 640 nm with respect to the colored light G having a wavelength of 546 nm; and ΔBG represents lateral chromatic aberration in the direction of pixel shift of the colored light B having a wavelength of 450 nm with respect to the colored light G having a wavelength of 546 nm.

It is further preferable that conditional formulae (1a) and (2a) below be fulfilled:

$$|\Delta RG| \leq 0.3\, d \tag{1a}$$

$$|\Delta BG| \leq 0.3\, d \tag{2a}$$

These conditional formulae (1a) and (2a) define, within the conditional range defined by the conditional formulae (1) and (2), a conditional range further preferable out of the above-stated points and other considerations.

The conditional formulae (1), (1a), (2), and (2a) define a favorable conditional range for effectively preventing a projected image from becoming a double-line-like image. When the value of |ΔRG| or |ΔBG| exceeds 0.5 d, the area of peaks overlapping each other in FIG. 9C becomes less than 60%. As a result, a valley between the peaks becomes larger and the projected image sufficiently appears a double-line-like image. When the values of |ΔRG| and |ΔBG| become less than 0.3 d, the area of peaks overlapping each other in FIG. 9C exceeds 70%, thus making less outstanding the lateral chromatic aberration in the direction of pixel shift. Therefore, a sharp line image without a visible double line can be displayed.

As described above, fulfilling the conditional formulae (1) and (2), preferably fulfilling the conditional formulae (1a) and (2a), permit achieving higher image quality of a projected image. Suppressing the lateral chromatic aberration in a normal refractive optical system requires the use of a large number of lenses of expensive glass having anomalous dispersibility, which results in an increase in the number of lenses, thus inevitably leading to considerable cost increase. Further, making use of the variable aperture effect in order to achieve higher contrast makes an image more remarkably appear a double-line, thus resulting in further deterioration in the resolution feeling. Use of a mirror as an optical element composing the projection optical system permits inexpensive configuration without causing lateral chromatic aberration and also permits achieving higher contrast while maintaining the high resolution feeling. For example, the projection optical system PO described above (FIG. 1) has four curved mirrors M1 to M4 and two substantially non-power refractive lenses L1 and L2 for aberration correction; therefore, and thus the conditional formulae (1), (1a), (2), and (2a) described above can be fulfilled to thereby easily provide the effect described above.

From the viewpoints described above, to fulfill the conditional formulae (1) and (2), it is preferable that, instead of composing the projection optical system with a refractive optical elements only, three or more curved mirrors be provided as optical elements having an optical power, as is the case with the projection optical system PO (FIG. 1) described above. The presence of three or more curved mirrors can effectively reduce power shared by the refractive system. Therefore, a multimirror projection optical system is preferable which has a large power shared by a reflection system. In the multimirror projection optical system, no refractive optical element is used or a refractive optical element, if any, is just subsidiary. Therefore, in order that the projection optical system fulfills the conditional formula (1) and (2), it is preferable that a curved mirror and a refractive lens, one or more for each, be provided as optical elements having an optical power and also that conditional formula (3) below be fulfilled:

$$0.01 \times \Sigma|\phi M| > \Sigma|\phi L| \qquad (3)$$

where $\phi M$ represents the optical power of each of curved mirrors, $\phi L$ represents the optical power of each of refractive lenses, $\Sigma|\phi M|$ represents a sum of absolute values of optical power of the curved mirrors, and $\Sigma|\phi L|$ represents a sum of absolute values of optical power of the refractive lenses.

As described above, in the image projection apparatus provided with the projection optical system having curved mirrors (preferably, 3 or more) as an optical element having an optical power, providing a pixel shift mechanism which performs pixel shift by linking to image display switching made by the display device permits achieving higher definition due to the pixel shift effect and the like while suppressing deterioration in the image quality due to the trace of cutting created during mirror processing. Further, providing a variable aperture mechanism which dynamically changes the amount of projected light in accordance with the brightness of an image displayed on the display device surface permits achieving higher contrast and the like due to the variable aperture effect. In the multimirror projection optical system, lateral chromatic aberration can be easily reduced, thus permitting effectively suppressing projected image from appearing like a double line, which is a characteristic observed in oblique pixel arrangement. Even if a double line appears clearly due to the variable aperture effect, fulfilling the conditional formulae (1) and (2) permits a sharp line image with a less outstanding double line. Moreover, even if a stripe pattern caused by the trace of cutting appears clearly due to the variable aperture effect, the stripe pattern is less likely to be visible due to the pixel shift effect.

Like the projection optical system PO shown in FIG. 1, it is preferable to provide a configuration such that a plurality of curved mirrors are provided as optical elements having an optical power, one of which is vibrated to thereby perform pixel shift. Providing a configuration such that one mirror is slightly decentered permits easily achieving weight saving and downsizing of the image projection apparatus. Moreover, in providing pixel shift effect, it is preferable that oblique pixel arrangement be adopted such that the pixels on the display device surface are square pixels, each of which is arranged obliquely by 45 degrees with respect to the longer sides or the shorter sides of the display device surface described above. It is further preferable that the pixel shift be performed along the diagonal line of each square pixel. In the oblique pixel arrangement such that, on the display device surface formed of the plurality of square pixel, each square pixel is arranged obliquely by 45 degrees with respect to the longer sides or the shorter sides of the display device surface, it is effective, in achieving higher definition due to pixel shift effect, to perform pixel shift along the diagonal line of each square pixel. The amount of shift to be performed on the display screen surface in the vertical direction, the horizontal direction, the oblique direction, or the vertical and horizontal directions may be less than the pixel pitch. However, when the oblique pixel arrangement described above is adopted, it is preferable, in relation to the shape of a pixel, the direction of pixel shift, and the like, that the amount of pixel shift is equal to approximately half the length of a diagonal line of each square pixel.

In a case where a mirror to be slightly decentered for pixel shift is large in size, this results in upsizing and complication of mechanical pixel shift mechanisms, such as a mirror holding part, a mirror decentering part, and the like, and also deterioration in the optical performance. Thus, it is preferable that a mirror to be slightly decentered be as small as possible and that a mirror at least other than the largest curved mirror be slightly decentered. Therefore, it is desirable that the projection optical system have a plurality of mirrors, at least one of which is a curved mirror having an optical power, and that, assuming that the curved mirror of those descried above that has the largest effective optical region is the "largest curved mirror", pixel shift be performed on the screen surface in the vertical direction, or the horizontal direction, or the oblique (for example, a direction along a image diagonal line) direction, or the vertical and horizontal directions within the range of a pixel pitch by slightly decentering the mirror (preferably, curved mirror) other than the largest curved mirror while the largest curved mirror is kept in a fixed state.

According to the configuration such that a mirror (preferably, curved mirror), other than the largest curved mirror which is kept in a fixed state, is slightly decentered, a reflective optical element having a large reflective surface size and a heavy weight no longer have to be decentered. This permits downsizing of the mechanisms such as the holding mechanism, the decentering mechanism, and the like of the reflective optical element. Moreover, considering the sensitivity of a mirror, the configuration such that a mirror other than the largest curved mirror is slightly decentered can improve the accuracy in the amount of pixel shift achieved by slight decentering. Furthermore, no additional new optical member is required for pixel shift; therefore, the number of components required is smaller compared to the configuration such that image projection is achieved by use of the optical power of a refractive optical system, thus providing a low-cost projection optical system. Thus, in the low-cost, compact projection optical system, pixel shift can be achieved with a high accuracy while maintaining a favorable optical performance. As a result, the pixel shift makes the contour of pixels projected on the screen surface less outstanding to thereby permit the display of a smooth image, thus permitting more stably achieving a higher-grade image through an improvement in the resolution. The use of this projection optical system in an image projection apparatus, such as a rear projector, a front projector, or the like, can largely contribute to slimming-down, weight-saving, downsizing, cost reduction, performance enhancement, function enhancement, and the like of this apparatus.

Assuming that a curved mirror to be slightly decentered for performing pixel shift is a "slightly decentered curved mirror", it is preferable that the slightly decentered curved mirror be arranged next to the aforementioned largest curved mirror at the reduction side thereof. If a reflective surface arranged in the refractive optical system is slightly decentered, chromatic aberration results, which leads to performance degradation. If the refractive optical system is not arranged between the largest curved mirror and the slightly decentered curved mirror, chromatic aberration and thus performance degradation hardly occur. Moreover, this alleviates the condition of interference of the slightly decentered curved mirror with a curved mirror arranged thereabove or therebelow, the screen, or a back mirror, thereby permitting a greater degree of freedom in the arrangement of the mechanical configuration. From this view point, in the projection optical system shown in FIG. 1, the third curved mirror M3 is provided as the slightly decentered mirror.

Assuming that a ray exiting from the image center of the display device surface and passing through the center of the aperture is a "basic ray", it is preferable that a plane including an incidence ray and a reflecting ray formed by the basic ray with respect to the slightly decentered curved mirror and a plane including an incidence ray and a reflecting ray formed by the basic ray with respect to the largest curved mirror be in the same plane. Such an arrangement of the slightly decentered curved mirror and the largest curved mirror permits a thinner thickness of the projection optical system than that of a coaxial refractive optical system. In the projection optical system PO shown in FIG. 1, the third curved mirror M3 as the slightly decentered curved mirror and the fourth curved mirror M4 as the largest curved mirror are provided in this arrangement.

As in the projection optical system PO shown in FIG. 1, it is preferable that at least four curved mirrors be provided. Providing at least four curved mirrors can ensure a sufficiently favorable optical performance in a wide-angle oblique projection optical system. Providing three or less curved mirrors makes it difficult in terms of design and manufacture to provide an optical performance required as the projection optical system. However, note that the smaller number of optical surfaces is more preferable in terms of costs and that an increase in the number of optical surfaces also brings disadvantages in the arrangement of optical elements in the housing. Therefore, it is further preferable that four surfaces in total be provided as curved mirrors. Even with four curved mirrors, a satisfactorily favorable optical performance can be ensured when used as a wide-angle oblique projection optical system.

In the projection optical system PO shown in FIG. 1, the refractive surfaces (refractive lenses L1, L2) having a rotation-symmetric aspherical shape or a rotation-asymmetric free curved shape are used for aberration correction. A transmissive optical element having a refractive surface is easier to manufacture and adjust than a reflective optical element since, due to low relative refractive index thereof, the transmissive optical element typically has low error sensitivity. Therefore, providing aberration correction capability to the transmissive optical element in addition to the reflective optical element having an optical power results in a lower manufacturing difficulty level, thus permitting cost reduction. To provide this effect, it is preferable that at least one transmissive optical element having an aberration correction capability be provided. Further, providing the transmissive optical element with rotation-symmetric aspherical shape or rotation-asymmetric free curved shape permits an improvement in aberration correction effect while maintaining low error sensitivity, and providing it with substantially non-power surface permits even lower error sensitivity. Moreover, in a wide-angle decentered optical system, such as the projection optical system PO, correcting rotation-asymmetric aberration permits even more favorable optical performance. Therefore, it is preferable that a transmissive optical element have as an aberration correction refractive surface at least one refractive surface composed of a rotation-symmetric aspherical surface or a rotation-asymmetric free curved surface.

In the projection optical system PO shown in FIG. 1, the first curved mirror M1 has spherical shape. In this manner, assuming that of a plurality of curved mirrors included in the projection optical system, the curved mirror at the most reduction side is a "first curved mirror" and the curved mirror at the second position when counted from the reduction side is a "second curved mirror", it is preferable that at least one of the first and second curved mirrors have a spherical shape. In the projection optical system having a plurality of curved mirror, the sensitivity of the first and second curved mirrors improves. Thus, forming one or both sides of the first and second curved mirrors required to have high profile irregularity into a spherical shape permits processing high profile irregularity through polishing. Further, building at a spherical surface receiver is possible, thus permitting minimizing building errors. Since glass with a low linear expansion coefficient, instead of resin, can be used, focusing shift caused by temperature change can be suppressed.

In the projection optical system PO shown in FIG. 1, the curved mirrors M2 to M4 having a curved reflective surface in a rotation-symmetric aspherical shape or a rotation-asymmetric free curved shape are used for aberration correction. Effectively arranging an optical surface for aberration correction is important to achieve higher performance while providing good balance between this arrangement and wider angle, downsizing, etc. In addition, it is preferable that an optical surface at the reduction side that is required to have high profile irregularity have a spherical shape. Therefore, it is preferable that, in the projection optical system that performs oblique enlargement projection of an image formed on the display device surface onto the screen surface, a plurality of curved mirrors and a plurality of refractive lenses for aberration correction be provided and that at least one of the first and second curved mirrors have spherical shape while at least one of the remaining curved mirrors have a rotation-asymmetric free curved shape. It is further preferable that at least one of the remaining curved mirrors have a rotation-symmetric aspherical shape. In this manner, the use of a plurality of curved mirrors and a plurality of refractive lenses for aberration correction can provide even larger effect described above.

According to the invention, pixel shift is performed in compliance with predetermined requirements. Thus, in a low-cost, compact projection optical system, pixel shift can be achieved with high accuracy while maintaining favorable optical performance, thereby permitting effective pixel shift. This makes the contour of the pixels projected on the screen surface less outstanding, thereby further permitting display of a smooth image and permitting more stably achieving a higher-grade image through an improvement in the resolution. Therefore, the use of a projection optical system according to the present invention in an image projection apparatus, such as a rear projector, a front projector, or the like, can contribute to slimming-down, weight-saving, downsizing, cost reduction, performance enhancement, function enhancement, and the like of the apparatus. The pixel shift described above can be achieved by, for example, a pixel shift mechanism that links it to switching of the image display. Further, by providing a variable aperture mechanism that dynamically changes the amount of projected light in accordance with the brightness of an image displayed on the display device surface, higher contrast can be achieved by stressing the tone of a picture scene displayed, so that a smooth, high resolution image can be provided even for a high contrast image by fulfilling predetermined requirements concerning lateral chromatic aberration.

EXAMPLE

Hereinafter, a practical example of the projection optical system, the image projection apparatus, and the like embodying the present invention will be presented with reference to their construction data and the like. The example presented below is a numerical example of a projection optical system corresponding to the embodiment described previously. Thus, the optical construction diagram of the projection optical system shown in FIG. 1 shows the optical arrangement, projection optical path, and other features of the example. The construction data of the example shows the optical arrangement of the system including from the display device surface So at the reduction side (corresponding to the object surface in enlargement projection) to the screen surface Si at the enlargement side (corresponding to the image surface in enlargement projection). The n-th surface counted from the reduction side is represented by Sn (n=1, 2, 3, . . . ). It should be noted that surfaces S1 and S2 respectively correspond to both side surfaces of the cover glass CG that covers the display device surface So to protect it, and thus do not constitute part of the projection optical system.

How each optical surface is arranged is represented by coordinates (x, y, z) (mm), as measured in a global rectangular coordinate system (x, y, z), of the origin (0) and the coordinate axis vectors (VX, VY) of the local rectangular coordinate system (X, Y, Z) established with its origin (0) located at the vertex of the optical surface. Here, all the coordinate systems are defined as right-hand systems, and the global rectangular coordinate system (x, y, z) is an absolute coordinate system that coincides with the local rectangular coordinate system (X, Y, Z) established for the display device surface So. Thus, the origin (0) of the global rectangular coordinate system (x, y, z) coincides with the origin (0) located at the center of the display device surface So, the vector VX on the display device surface So is parallel to a line normal to the display device surface So, the vector VY is perpendicular to the vector VX and parallel to the shorter sides of the image on the display device surface So. For an optical surface that forms part of a coaxial system with an optical surface represented by coordinate data (x, y, z) regarded as the foremost surface, its arrangement is represented by the axial distance T' (mm) in the X direction with respect to the immediately previous optical surface. Also listed together with other data are the refractive index N for the d-line of the medium located on the entrance side of each optical surface, the refractive index N' for the d-line of the medium located on the exit side thereof (when the optical surface in question is a reflective surface, its refractive index takes a negative value), and the Abbe number (vd) of the optical material.

The surface shape of each optical element is represented by the curvature C0 (mm$^{-1}$), the radius of curvature r (mm), etc. of the optical surface(s) it has. For example, a surface Sn marked with an asterisk (*) is a rotation-symmetric aspherical surface, whose surface shape is defined by formula (AS) below within the local rectangular coordinate system (X, Y, Z) having its origin (0) at the vertex of the surface. On the other hand, a surface Sn marked with a dollar sign ($) is a rotation-asymmetric aspherical surface (so-called free curved surface), whose surface shape is defined by formula (BS) below within the local rectangular coordinate system (X, Y, Z) having its origin (0) at the vertex of the surface. Listed together with other data are rotation-symmetric aspherical surface data and rotation-asymmetric aspherical surface data. It should be noted that any coefficient that is not expressly shown equals zero, and that, for all data, "E-n" stands for "×10$^{-n}$".

$$X=(C0 \cdot H^2)/(1+\sqrt{1-\epsilon \cdot C0^2 \cdot H^2})+\Sigma(A(i) \cdot H^i) \quad (AS)$$

$$X=(C0 \cdot H^2)/(1+\sqrt{1-\epsilon \cdot C0^2 \cdot H^2})+\Sigma(G(j,k) \cdot Y^j \cdot Z^k) \quad (BS)$$

wherein
- X represents the displacement (with respect to the vertex) from the reference surface as measured in the X direction at the height H;
- H represents the height in a direction perpendicular to the X-axis (H=$\sqrt{Y^2+Z^2}$);
- C0 represents the curvature at the vertex (a positive or negative sign added with respect to the X-axis in the local rectangular coordinate system, a positive sign added when the center of the curvature lies in the positive direction on the vector VX; C0=1/r);
- $\epsilon$ represents the quadric surface parameter;
- A(i) represents the rotation-symmetric aspherical surface coefficient of order i; and
- G(j, k) represents the rotation-asymmetric aspherical surface coefficient of order j with respect to Y and order k with respect to Z.

The dimensions (mm) of the image on the display device surface So are LY=±2.754 and LZ=±4.892. Here, the image on the display device surface So has a rectangular shape, with LY representing the dimension of the image on the display device surface So along the shorter sides thereof (that is, in the Y direction) and LZ representing the dimension of the image on the display device surface So along the longer sides thereof (that is, in the Z direction). The magnification ($\beta$) and F numbers (FnoY, FnoZ) of the entire system are $\beta$=95.03, FnoY=2.83, and FnoZ=2.81, where FnoY represents the F number in the vertical direction (Y direction) and FnoZ represents the F number in the horizontal direction (Z direction).

Oblique pixel arrangement is adopted such that pixels on a display device surface So are square pixels, each of which is arranged obliquely by 45 degrees with respect to the longer sides or the shorter sides of the display device surface So, and pixel shift is performed along the diagonal line of each square pixel. Tables 1 and 2 show data corresponding to the conditional formulae (1), (1a), (2), and (2a) and related data. Note that evaluation points for the lateral chromatic aberration ($\mu$m) in the direction of pixel shift, i.e., $\Delta$RG and $\Delta$BG, are located at 25 coordinates (Y, Z) on the half image of the display device surface So, and the amount of pixel shift d is equal to 7.637($\mu$m) and the pixel pitch (length of a diagonal line) p is equal to 2d=15.274($\mu$m). Table 3 shows data corresponding to the conditional formula (3) and its related data. However, since the example includes a free curved surface, assuming that a ray reaching the center of the image plane of the screen surface Si is a principal ray, an optical power on a meridional cross section (XY cross section) near the principal ray defines an optical power of each surface (E–n=×10$^{-n}$).

FIG. 11A to 11Y show spot diagrams of the example. The spot diagrams show the imaging performance (in ±1 mm divisions) observed for 3 different wavelengths (460 nm, 546 nm, and 620 nm) at 25 evaluation points on the screen surface Si. The coordinates (Y, Z) in the diagrams are local coordinates (Y, Z; mm; e–n=×10$^{-n}$) on the screen surface Si corresponding to the projection positions of the spot barycenters of the individual evaluation points. Since this example is constructed as an optical system plane-symmetric with respect to the XY-plane, the spot diagrams only show the positive-Z-side half of the screen surface Si, and the other half is omitted from illustration. The evaluation points conjugate with an array of vertically five and horizontally five points that equally divide the Z-side half of the display device surface So. When multiplied with the magnification $\beta$, the Y and Z values of the local coordinates of the points on the display device surface So indicate the ideal imaging points on the spot diagram, and the deviations from those calculated values indicate distortion. In the spot diagrams, the starting point lies on the ±Y and +Z sides of the display device surface So. The image inverts vertically at the ceiling, i.e., the flat mirror MF, and thus the sign (+/−) of Y reverses. Note that, in the optical construction of this example, even if pixel shift is performed by slightly decentering the third curved mirror M3, this has almost no effect on the optical performance.

Construction Data of the Example

So (Display device surface)
Coordinates:

O: 0.00000, 0.00000, 0.00000
VX: 1.00000000, 0.00000000, 0.00000000
VY: 0.00000000, 1.00000000, 0.00000000
N = 1.00000

-continued

C0 = 0.00000000 (r = $\infty$)
N' = 1.00000
T' = 0.47
S1 (Entrance side surface of cover glass CG)

N = 1.00000
C0 = 0.00000000 (r = $\infty$)
N' = 1.51872, vd = 64.20
T' = 3
S2 (Exit side surface of cover glass CG)

N = 1.51872, vd = 64.20
C0 = 0.00000000(r = $\infty$)
N' = 1.00000
S3 (First curved mirror M1)
Coordinates:

O: 84.77600, −8.80205, 0.00000
VX: 0.99335574, 0.11508424, 0.00000000
VY: −0.11508424, 0.99335574, 0.00000000
N = 1.00000
C0 = −0.01024430(r = −97.6153)
N' = −1.00000
S4* (Entrance side surface of refractive lens L1)
Coordinates:

O: 33.18400, −26.78580, 0.00000
VX: −0.99802020, −0.06289414, 0.00000000
VY: −0.06289414, 0.99802020, 0.00000000
N = 1.00000
C0 = 0.00000000(r = $\infty$)
Aspherical surface data:

$\epsilon$ = 1.00000
A(4) = 1.73282E−6
A(6) = −2.51393E−8
A(8) = 5.8343E−10
A(10) = −6.49544E−12
A(12) = 2.72743E−14
N' = 1.52729, vd = 56.38
S5 (Exit side surface of refractive lens L1)
Coordinates:

O: 31.23500, −27.67100, 0.00000
VX: −0.99802020, −0.06289414, 0.00000000
VY: −0.06289414, 0.99802020, 0.00000000
N = 1.52729, vd = 56.38
C0 = 0.00000000 (r = $\infty$)
N' = 1.00000
S6* (Second curved mirror M2)
Coordinates:

O: 13.34700, −24.19590, 0.00000
VX: −0.99395174, 0.10981775, 0.00000000
VY: 0.10981775, 0.99395174, 0.00000000
N = 1.00000
C0 = 0.00931427 (r = 107.3621)
Aspherical surface data:

$\epsilon$ = 6.42234
A(4) = 1.4105E−6
A(6) = 8.58819E−10
A(8) = −2.64074E−12
A(10) = 5.41875E−15
A(12) = −4.40215E−18
N' = −1.00000
S7$ (Entrance side surface of refractive lens L2)
Coordinates:

O: 34.67500, −55.70520, 0.00000
VX: 0.01157085, −0.99993306, 0.00000000
VY: 0.99993306, 0.01157085, 0.00000000
N = 1.00000
C0 = 0.00000000 (r = $\infty$)
Aspherical surface data:

$\epsilon$ = 1.00000
G(3, 0) = 8.61966E−6
G(4, 0) = −1.32367E−6

-continued

G(5, 0) = 1.81013E−9
G(6, 0) = −2.38497E−9
G(7, 0) = 3.31534E−10
G(8, 0) = −3.36791E−12
G(9, 0) = −7.71912E−13
G(10, 0) = 2.42779E−14
G(1, 2) = −6.6744E−5
G(2, 2) = −2.40316E−6
G(3, 2) = 8.97504E−8
G(4, 2) = 3.54681E−10
G(5, 2) = 4.62364E−10
G(6, 2) = −1.29461E−11
G(7, 2) = −6.77249E−13
G(8, 2) = 2.31117E−14
G(0, 4) = 2.46946E−6
G(1, 4) = 2.0643E−7
G(2, 4) = −6.56518E−10
G(3, 4) = −1.59192E−11
G(4, 4) = −1.66117E−11
G(5, 4) = −6.9256E−13
G(6, 4) = 3.52199E−14
G(0, 6) = −3.00301E−9
G(1, 6) = −1.27708E−10
G(2, 6) = 2.16243E−12
G(3, 6) = 6.36425E−13
G(4, 6) = 4.02125E−15
G(0, 8) = 5.95575E−12
G(1, 8) = 2.69834E−13
G(2, 8) = −1.86336E−14
G(0, 10) = −1.57267E−14
N' = 1.52729, vd = 56.38
S8 (Exit side surface of refractive lens L2)
Coordinates:

O: 39.23600, −57.65510, 0.00000
VX: 0.01157085, −0.99993306, 0.00000000
VY: 0.99993306, 0.01157085, 0.00000000
N = 1.52729, vd = 56.38
C0 = 0.00000000 (r = ∞)
N' = 1.00000
S9$ (Third curved mirror M3)
Coordinates:

O: 69.48900, −95.92290, 0.00000
VX: 0.91941593, −0.39328660, 0.00000000
VY: 0.39328660, 0.91941593, 0.00000000
N = 1.00000
C0 = −0.00044085 (r = −2268.3247)
Aspherical surface data:

ϵ = 1.00000
G(2, 0) = 0.000280832
G(3, 0) = −1.18927E−5
G(4, 0) = −8.7313E−7
G(5, 0) = −8.41805E−9
G(6, 0) = 7.25923E−12
G(7, 0) = 9.49225E−12
G(8, 0) = 1.04654E−13
G(9, 0) = −2.19175E−14
G(10, 0) = 7.21665E−16
G(0, 2) = −0.000513986
G(1, 2) = −8.55552E−5
G(2, 2) = −1.12351E−6
G(3, 2) = 2.49379E−8
G(4, 2) = 8.10459E−10
G(5, 2) = 2.58668E−11
G(6, 2) = 8.12093E−13
G(7, 2) = 2.11287E−15
G(8, 2) = −1.19879E−15
G(0, 4) = 1.17194E−6
G(1, 4) = 5.41384E−8
G(2, 4) = 3.65203E−10
G(3, 4) = −1.88985E−11
G(4, 4) = −1.18863E−12
G(5, 4) = −3.78949E−14
G(6, 4) = 7.8927E−17
G(0, 6) = −9.29742E−11
G(1, 6) = 3.36094E−13
G(2, 6) = 1.0404E−12

-continued

G(3, 6) = 3.77869E−14
G(4, 6) = 2.03532E−15
G(0, 8) = −3.88723E−13
G(1, 8) = −1.38874E−15
G(2, 8) = −1.35813E−15
G(0, 10) = 5.45906E−16
N' = −1.00000
S10$ (Fourth curved mirror M4)
Coordinates:

O: 23.67600, −62.46640, 0.00000
VX: −0.99802624, 0.06279831, 0.00000000
VY: 0.06279831, 0.99802624, 0.00000000
N = 1.00000
C0 = 0.05625150 (r = 17.7773)
Aspherical surface data:

ϵ = −1.54968
G(2, 0) = −0.0018995
G(3, 0) = −1.99289E−5
G(4, 0) = −4.72141E−7
G(5, 0) = −5.6067E−9
G(6, 0) = −2.08536E−11
G(7, 0) = 1.58062E−13
G(8, 0) = 2.17055E−15
G(9, 0) = 6.89436E−18
G(10, 0) = −2.2838E−20
G(0, 2) = −0.00418619
G(1, 2) = −9.36187E−5
G(2, 2) = −2.59756E−6
G(3, 2) = −4.09752E−8
G(4, 2) = −4.09984E−10
G(5, 2) = −3.01393E−12
G(6, 2) = −1.3615E−14
G(7, 2) = −3.03519E−17
G(8, 2) = −9.24981E−20
G(0, 4) = −2.04797E−7
G(1, 4) = −3.13937E−9
G(2, 4) = 1.415E−10
G(3, 4) = 2.53309E−12
G(4, 4) = 1.03641E−14
G(5, 4) = 6.70735E−17
G(6, 4) = 5.8545E−19
G(0, 6) = 1.66422E−10
G(1, 6) = 4.93631E−12
G(2, 6) = 2.84416E−14
G(3, 6) = −1.4395E−16
G(4, 6) = −2.85288E−18
G(0, 8) = −6.936E−14
G(1, 8) = −1.98833E−15
G(2, 8) = −4.60481E−18
G(0, 10) = −9.75378E−18
N' = −1.00000
S11 (Flat mirror MF)
Coordinates:

O: 400.00000, −441.69700, 0.00000
VX: 0.10902324, −0.99403920, 0.00000000
VY: 0.99403920, 0.10902324, 0.00000000
N = 1.00000
C0 = 0.00000000 (r = ∞)
N' = −1.00000
Si (Screen surface)
Coordinates:

O: 204.75705, −187.50166, 0.00000
VX: 0.93901635, 0.34387248, 0.00000000
VY: −0.34387248, 0.93901635, 0.00000000

TABLE 1

Conditional formula (1): Lateral chromatic aberration ΔRG (wavelength 640-546 nm)

| Y | Z | | | | |
|---|---|---|---|---|---|
|  | 0 | 1.22 | 2.45 | 3.67 | 4.89 |
| 2.75 | −0.105 | −0.116 | −0.137 | −0.200 | −0.316 |
| 1.38 | 0.126 | 0.137 | 0.168 | 0.200 | 0.200 |
| 0 | 0.095 | 0.137 | 0.221 | 0.337 | 0.442 |
| −1.38 | 0.032 | 0.084 | 0.232 | 0.442 | 0.631 |
| −2.75 | 0.221 | 0.295 | 0.484 | 0.747 | 1.010 |

Maximum value of |ΔRG|/d = 1.010/7.637 = 0.13

TABLE 2

Conditional formula (2): Lateral chromatic aberration ΔBG (wavelength 450-546 nm)

| Y | Z | | | | |
|---|---|---|---|---|---|
|  | 0 | 1.22 | 2.45 | 3.67 | 4.89 |
| 2.75 | 0.147 | 0.158 | 0.200 | 0.316 | 0.526 |
| 1.38 | −0.263 | −0.284 | −0.347 | −0.400 | −0.389 |
| 0 | −0.221 | −0.274 | −0.442 | −0.652 | −0.831 |
| −1.38 | −0.105 | −0.200 | −0.463 | −0.821 | −1.168 |
| −2.75 | −0.442 | −0.568 | −0.905 | −1.379 | −1.842 |

Maximum value of |ΔBG|/d = 1.842/7.637 = 0.24

TABLE 3

Data corresponding to conditional formula (3) and relevant data

| Optical element | φM | φL |
|---|---|---|
| M1 | 0.0204886 | — |
| L1 | — | −1.05262E−12 |
| M2 | −0.0235847 | — |
| L2 | — | −4.48092E−9 |
| M3 | 0.000999749 | — |
| M4 | −0.00367232 | — |
| Σ\|φM\| |  | 0.048745 |
| Σ\|φL\| |  | 4.48197E−9 |
| Σ\|φL\|/Σ\|φM\| |  | 9.2E−8 |

What is claimed is:

1. A projection optical system that performs enlargement projection of an image on a display device surface formed of a plurality of pixels onto a screen surface, wherein pixel shift by less than a pixel pitch is performed on the screen surface in a vertical direction, a horizontal direction, an oblique direction, or a vertical and horizontal directions, and wherein conditional formulae (1) and (2) below are fulfilled over an entire image range:

$$|\Delta RG| \leq 0.5\, d \quad (1)$$

$$|\Delta BG| \leq 0.5\, d \quad (2)$$

where d represents an amount of pixel shift (>0),

ΔRG represents lateral chromatic aberration in a direction of pixel shift of colored light R having a wavelength of 640 nm with respect to colored light G having a wavelength of 546 nm, and ΔBG represents lateral chromatic aberration in a direction of pixel shift of colored light B having a wavelength of 450 nm with respect to the colored light G having a wavelength of 546 nm.

2. The projection optical system according to claim 1, comprising three or more curved mirrors as optical elements having an optical power.

3. The projection optical system according to claim 1, comprising a curved mirror and a refractive lens, one or more for each, as optical elements having an optical power, and fulfilling conditional formula (3) below:

$$0.01 \times \Sigma|\phi M| > \Sigma|\phi L| \quad (3)$$

where

φM represents an optical power of each of curved mirrors,
φL represents an optical power of each of refractive lenses,
Σ|φM| represents a sum of absolute values of optical powers of the curved mirrors, and
Σ|φL| represents a sum of absolute values of optical powers of the refractive lenses.

4. The projection optical system according to claim 2, comprising a curved mirror and a refractive lens, one or more for each, as optical elements having an optical power, and fulfilling conditional formula (3) below:

$$0.01 \times \Sigma|\phi M| > \Sigma|\phi L| \quad (3)$$

where

φM represents an optical power of each of curved mirrors,
φL represents an optical power of each of refractive lenses,
Σ|φM| represents a sum of absolute values of optical powers of the curved mirrors, and
Σ|φL| represents a sum of absolute values of optical powers of the refractive lenses.

5. The projection optical system according to claim 1, comprising, as optical elements having an optical power, a plurality of curved mirrors, one of which is vibrated to perform the pixel shift.

6. The projection optical system according to claim 2, comprising, as optical elements having an optical power, a plurality of curved mirrors, one of which is vibrated to perform the pixel shift.

7. The projection optical system according to claim 3, comprising, as optical elements having an optical power, a plurality of curved mirrors, one of which is vibrated to perform the pixel shift.

8. The projection optical system according to claim 4, comprising, as optical elements having an optical power, a plurality of curved mirrors, one of which is vibrated to perform the pixel shift.

9. The projection optical system according to claim 1, wherein oblique pixel arrangement is adopted such that the pixels on the display device surface are square pixels, each of which is arranged obliquely by 45 degrees with respect to longer sides or shorter sides of the display device surface, and wherein the pixel shift is performed along a diagonal line of each square pixel.

10. The projection optical system according to claim 2, wherein oblique pixel arrangement is adopted such that the pixels on the display device surface are square pixels, each of which is arranged obliquely by 45 degrees with respect to longer sides or shorter sides of the display device surface, and wherein the pixel shift is performed along a diagonal line of each square pixel.

11. The projection optical system according to claim 5,
wherein oblique pixel arrangement is adopted such that the pixels on the display device surface are square pixels, each of which is arranged obliquely by 45 degrees with respect to longer sides or shorter sides of the display device surface, and
wherein the pixel shift is performed along a diagonal line of each square pixel.

12. The projection optical system according to claim 6,
wherein oblique pixel arrangement is adopted such that the pixels on the display device surface are square pixels, each of which is arranged obliquely by 45 degrees with respect to longer sides or shorter sides of the display device surface, and
wherein the pixel shift is performed along a diagonal line of each square pixel.

13. The projection optical system according to claim 8,
wherein oblique pixel arrangement is adopted such that the pixels on the display device surface are square pixels, each of which is arranged obliquely by 45 degrees with respect to longer sides or shorter sides of the display device surface, and
wherein the pixel shift is performed along a diagonal line of each square pixel.

14. The projection optical system according to claim 9, wherein an amount of the pixel shift is approximately half a length of the diagonal line of each square pixel.

15. The projection optical system according to claim 10, wherein an amount of the pixel shift is approximately half a length of the diagonal line of each square pixel.

16. The projection optical system according to claim 11, wherein an amount of the pixel shift is approximately half a length of the diagonal line of each square pixel.

17. The projection optical system according to claim 12, wherein an amount of the pixel shift is approximately half a length of the diagonal line of each square pixel.

18. The projection optical system according to claim 13, wherein an amount of the pixel shift is approximately half a length of the diagonal line of each square pixel.

19. An image projection apparatus comprising a projection optical system, a
display device, and a pixel shift mechanism,
wherein the projection optical system performs enlargement projection of an image on a display device surface formed of a plurality of pixels onto a screen surface, wherein pixel shift by less than a pixel pitch is performed on the screen surface in a vertical direction, a horizontal direction, an oblique direction, or a vertical and horizontal directions, and wherein conditional formulae (1) and (2) below are fulfilled over an entire image range:

$$|\Delta RG| \leq 0.5\, d \quad (1)$$

$$|\Delta BG| \leq 0.5\, d \quad (2)$$

where
d represents an amount of pixel shift (>0),
$\Delta RG$ represents lateral chromatic aberration in a direction of pixel shift of colored light R having a wavelength of 640 nm with respect to colored light G having a wavelength of 546 nm, and
$\Delta BG$ represents lateral chromatic aberration in a direction of pixel shift of colored light B having a wavelength of 450 nm with respect to the colored light G having a wavelength of 546 nm,
wherein the display device has oblique pixel arrangement such that the plurality of pixels on the display device surface are square pixels, each of which is arranged obliquely by 45 degrees with respect to longer sides or shorter sides of the display device surface, and forms an image based on an inputted image signal; and
wherein the pixel shift mechanism performs the pixel shift by linking to switching of image display by the display device.

20. The image projection apparatus according to claim 19, further comprising
a variable aperture mechanism that changes an amount of projection light based on information regarding brightness of the image that the image signal has.

21. The image projection apparatus according to claim 20, wherein a projection optical system thereof has four curved mirrors, and
wherein the variable aperture mechanism is arranged between the first and second curved mirror as counted from a display device side.

22. The image projection apparatus according to claim 19, wherein said projection optical system thereof comprises three or more curved mirrors as optical elements having an optical power.

23. The image projection apparatus according to claim 19, wherein said projection optical system thereof comprises,
a curved mirror and a refractive lens, one or more for each, as optical elements having an optical power, and
fulfills conditional formula (3) below:

$$0.01 \times \Sigma|\phi M| > \Sigma|\phi L| \quad (3)$$

where
$\phi M$ represents an optical power of each of curved mirrors,
$\phi L$ represents an optical power of each of refractive lenses,
$\Sigma|\phi M|$ represents a sum of absolute values of optical power of the refractive lenses.

24. The image projection apparatus according to claim 19, wherein said projection optical system thereof comprises, as optical elements having an optical power, a plurality of curved mirrors, one of which is vibrated to perform the pixel shift.

25. The image projection apparatus according to claim 23, wherein said projection optical system thereof comprises, as optical elements having an optical power, a plurality of curved mirrors, one of which is vibrated to perform the pixel shift.

26. The image projection apparatus according to claim 19, wherein the pixel shift is performed along a diagonal line of each square pixel.

27. The image projection apparatus according to claim 19, wherein an amount of the pixel shift is approximately half a length of the diagonal line of each square pixel.

* * * * *

UNITED STATES PATENT AND TRADEMARK OFFICE
CERTIFICATE OF CORRECTION

PATENT NO. : 7,524,068 B2
APPLICATION NO. : 11/414777
DATED : April 28, 2009
INVENTOR(S) : Kohtaro Hayashi et al.

It is certified that error appears in the above-identified patent and that said Letters Patent is hereby corrected as shown below:

Column 24:
lines 40-41, delete "$\Sigma|\varphi M|$ represents a sum of absolute values of optical power of the refractive lenses."
and insert
-- $\Sigma|\varphi M|$ represents a sum of absolute values of optical powers of the curved mirrors, and
$\Sigma|\varphi L|$ represents a sum of absolute values of optical powers of the refractive lenses. --.

Signed and Sealed this

Ninth Day of June, 2009

JOHN DOLL
*Acting Director of the United States Patent and Trademark Office*